United States Patent
Matsushima et al.

(10) Patent No.: US 11,132,149 B2
(45) Date of Patent: Sep. 28, 2021

(54) SYSTEM AND INFORMATION PROCESSING METHOD FOR PROVIDING AVAILABLE APPLICATIONS

(71) Applicants: Hiroyuki Matsushima, Kanagawa (JP); Ryoh Takemoto, Tokyo (JP)

(72) Inventors: Hiroyuki Matsushima, Kanagawa (JP); Ryoh Takemoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 415 days.

(21) Appl. No.: 16/079,281

(22) PCT Filed: Feb. 27, 2017

(86) PCT No.: PCT/JP2017/007562
§ 371 (c)(1),
(2) Date: Aug. 23, 2018

(87) PCT Pub. No.: WO2017/150472
PCT Pub. Date: Sep. 8, 2017

(65) Prior Publication Data
US 2021/0072931 A1    Mar. 11, 2021

(30) Foreign Application Priority Data
Feb. 29, 2016   (JP) ............................. JP2016-038046

(51) Int. Cl.
*G06F 3/12* (2006.01)

(52) U.S. Cl.
CPC .......... *G06F 3/1204* (2013.01); *G06F 3/1226* (2013.01); *G06F 3/1236* (2013.01); *G06F 3/1257* (2013.01); *G06F 3/1287* (2013.01)

(58) Field of Classification Search
CPC .... G06F 3/1204; G06F 3/1226; G06F 3/1236; G06F 3/1257; G06F 3/1287
See application file for complete search history.

(56) References Cited

U.S. PATENT DOCUMENTS

2008/0235680 A1   9/2008 Strauss et al.
2009/0276332 A1   11/2009 Gharabally et al.
(Continued)

FOREIGN PATENT DOCUMENTS

CN    103455505 A    12/2013
CN    104798416 A    7/2015
(Continued)

OTHER PUBLICATIONS

Extended European Search Report dated Nov. 22, 2018 in corresponding European Application No. 17759938.8.
(Continued)

*Primary Examiner* — Juan M Guillermety
(74) *Attorney, Agent, or Firm* — Harness, Dickey & Pierce, P.L.C.

(57) ABSTRACT

A first server includes a control unit that transmits, to a device in accordance with a request from the device, Web content data including at least display information that includes at least region information and that indicates an application available to the device related to the region information, and an application command causing the device to execute processing in connection with the application from the device, and the device includes: a Web browser including a display control unit that performs control to transmit a display information request including at least region information to request display information and display, on a display unit, a screen based on the Web content data received from the first server and an executing unit that requests the device to perform processing in connection with the application related to the application command included in the Web content data by executing the application command in accordance with user's operation via the screen; and a processing executing unit that, based on a request from the (Continued)

Web browser, performs processing in connection with the application.

15 Claims, 39 Drawing Sheets

(56) References Cited

U.S. PATENT DOCUMENTS

| | | |
|---|---|---|
| 2009/0276333 A1 | 11/2009 | Cortes et al. |
| 2009/0276433 A1 | 11/2009 | Fosback et al. |
| 2010/0205274 A1 | 8/2010 | Gharabally et al. |
| 2011/0016400 A1 | 1/2011 | Sakai |
| 2012/0042036 A1 | 2/2012 | Lau et al. |
| 2012/0229832 A1* | 9/2012 | Tsujimoto ............. G06F 3/1286 358/1.13 |
| 2013/0201522 A1* | 8/2013 | Ohashi .................. G06F 3/1288 358/1.15 |
| 2013/0325931 A1 | 12/2013 | Cheng et al. |
| 2014/0029051 A1* | 1/2014 | Kitada .................. G06F 3/1287 358/1.15 |
| 2014/0171116 A1 | 6/2014 | LaMarca et al. |
| 2014/0280462 A1 | 9/2014 | Gharabally et al. |
| 2015/0229788 A1* | 8/2015 | Shimizu ................... G06F 3/12 358/1.13 |
| 2015/0358487 A1 | 12/2015 | Sugiyama |
| 2016/0149885 A1 | 5/2016 | Negoro |
| 2016/0165088 A1* | 6/2016 | Saitoh ................ H04N 1/00498 358/1.15 |
| 2016/0295359 A1 | 10/2016 | Lamarca et al. |
| 2016/0307244 A1 | 10/2016 | Muller et al. |
| 2017/0255992 A1 | 9/2017 | Han |
| 2018/0024787 A1* | 1/2018 | Sakawaki ............. G06F 3/1287 358/1.15 |
| 2018/0167766 A1 | 6/2018 | LaMarca et al. |
| 2018/0213377 A1 | 7/2018 | Lau et al. |

FOREIGN PATENT DOCUMENTS

| | | |
|---|---|---|
| JP | 2002-328855 | 11/2002 |
| JP | 2010-522398 | 7/2010 |
| JP | 2010-182309 | 8/2010 |
| JP | 2011-022712 | 2/2011 |
| JP | 5400869 | 1/2013 |
| JP | 2016-085659 | 5/2016 |
| JP | 2016-105266 | 6/2016 |
| WO | 2015/178422 | 11/2015 |

OTHER PUBLICATIONS

International Search Report dated May 16, 2017 in PCT/JP2017/007562 filed Feb. 27, 2017.

Office Action dated Dec. 3, 2020 in Chinese Application No. 201780013880.8.

\* cited by examiner

FIG.5

| MODEL ID | MODEL NAME | MODEL CODE |
|---|---|---|
| M001 | Machine-001 | 3F08 |
| M002 | Machine-002 | 4G12 |
| M003 | Machine-003 | 5R33 |

FIG.6

| APP ID | LICENSE KEY | MODEL ID | VERSION INFORMATION |
|---|---|---|---|
| S001 | S001-111-222 | M001<br>M002 | 1.1<br>1.0 |
| S002 |  | M001<br>M003 | 1.1<br>1.0 |
| S003 | S003-555-666 | M001<br>M003 | 2.2<br>2.1<br>2.0 |

FIG.7

| ORGANIZATION ID | ORGANIZATION NAME | TYPE | REGION INFORMATION | DEALER OFFICE INFORMATION |
|---|---|---|---|---|
| O0001 | HEAD OFFICE | HEAD OFFICE | - | - |
| O0002 | JAPAN OFFICE | BRANCH OFFICE | JP | - |
| O0003 | AMERICA OFFICE | BRANCH OFFICE | US | - |
| O0004 | EUROPE OFFICE | BRANCH OFFICE | EU | - |
| O0005 | DEALER A | DEALER OFFICE | JP | JA5 |
| O0006 | DEALER B | DEALER OFFICE | JP | JA6 |
| O0007 | DEALER C | DEALER OFFICE | US | US7 |

FIG.8

| ORGANIZATION ID | APP ID | PUBLICATION STATE INFORMATION |
|---|---|---|
| O0001 | S001 | PUBLIC |
| O0001 | S002 | PUBLIC |
| O0001 | S003 | PUBLIC |
| O0002 | S004 | PUBLIC |
| O0002 | S005 | NON-PUBLIC |
| O0002 | S006 | PUBLIC |
| O0003 | S007 | NON-PUBLIC |
| O0003 | S008 | PUBLIC |
| O0003 | S009 | PUBLIC |

FIG.9

APP EXPLANATORY INFORMATION

| APP ID | LANGUAGE INFORMATION | DISPLAY NAME | INTRODUCTORY MESSAGE |
|---|---|---|---|
| S001 | JAPANESE | かんたんコピー | 手軽にコピーができます |
| S001 | ENGLISH | Easy Copier | You can copy easily |
| S002 | JAPANESE | OCRアプリ | テキスト文書に対して OCRを実施できます |
| S002 | FRENCH | OCR app | Vous pouvez effectuer l' OCR pour les documents texte |
| S003 | JAPANESE | 翻訳アプリ | 5言語に翻訳できます |

FIG.10

APP PRICE INFORMATION

| ORGANI-ZATION ID | APP ID | LANGUAGE INFORMATION | PRICE | PRICE EXPLANATION |
|---|---|---|---|---|
| O0001 | S001 | JAPANESE | 1000円 | 1年ごとに更新となります |
| O0001 | S001 | ENGLISH | 1000Yen | It will be updated every year. |
| O0001 | S002 | JAPANESE | 3000円 | 5ユーザまでご利用いただけます |
| O0001 | S002 | FRENCH | ¥3000 | Jusqu' à 5 utilisateurs sont disponibles. |
| O0001 | S003 | JAPANESE | 2000円 | 3ユーザまでご利用いただけます |

FIG.13

| APP ID | LICENSE TYPE | LICENSE FORM | PERIOD OF VALIDITY | VOLUME |
|---|---|---|---|---|
| S001 | Lic1 | FREE | NON (INDEFINITE PERIOD) | INDEFINITE |
| S003 | Lic2 | TRIAL | 3 MONTHS | INDEFINITE |
| S002 | Lic3 | NON-FREE | 1 YEAR | 1 |

FIG.14

| LICENSE TYPE | LICENSE KEY | IN-USE LICENSE NUMBER | USED LICENSE NUMBER |
|---|---|---|---|
| Lic1 | S001-111-222 | 1000 | 100 |
| Lic2 | S003-555-666 | 500 | 300 |
| Lic3 | S002-777-888 | 1 | 0 |
| Lic3 | S002-777-889 | 0 | 0 |

| LICENSE KEY | DEVICE NUMBER | PERIOD OF VALIDITY | VALIDITY STATE INFORMATION |
|---|---|---|---|
| S001-111-222 | 3F08-00001 | NON (INDEFINITE PERIOD) | VALID |
| S001-111-222 | 4G12-00002 | NON (INDEFINITE PERIOD) | INVALID |
| S003-555-666 | 3F08-00001 | 2015/12/31 | VALID |
| S003-555-666 | 5R33-00003 | 2015/06/30 | INVALID |
| S002-777-888 | 3F08-00004 | 2016/09/30 | VALID |

FIG.21

| ORGANIZATION ID | CONNECTION INFORMATION |
| --- | --- |
| O0001 | https://www.example.com/apps |
| O0002 | https://jp.example.com/apps |
| O0003 | https://us.example.com/apps |
| O0004 | https://eu.example.com/apps |
| O0005 | https://ja5.jp.example.com/apps |
| O0006 | https://ja6.jp.example.com/apps |
| O0007 | https://us7.us.example.com/apps |

| DEVICE NUMBER | CONNECTION INFORMATION |
|---|---|
| 3F08-00001 | https://jp.example.com/apps |
| 4G12-00002 | https://us.example.com/apps |
| 5R33-00003 | https://eu.example.com/apps |

FIG.27

REQUEST TO ACQUIRE CONNECTION INFORMATION

```
GET /discov?service=appsdownload&device_id=3F08-00005&region_code=JP&dealer_code=JA5 HTTP/1.1
Host: www.example.com
```

FIG.28

RESPONSE

```
HTTP/1.1 200 OK
Content-Type: application/json; charset=UTF8

{
 "appsdownload" : "https://www.example.com/apps"
}
```

FIG.29

REQUEST TO ACQUIRE CONNECTION INFORMATION (ACTUALLY NO LINE BREAK)

GET /discov?service=appsdownload%2Fapi+appsdownload%2Ftop+appsdownload%2Foperation+appsdownload%2Fstorage&device_id=3F08-00005&region_code=JP&dealer_code=JA5 HTTP/1.1
Host: www.example.com

FIG.30

RESPONSE

```
HTTP/1.1 200 OK
Content-Type: application/json; charset=UTF8

{
  "appsdownload/api" : "https://api.example.com/apps",
  "appsdownload/top" : "https://www.example.com/apps/top",
  "appsdownload/operation" : "https://www.operation.example.com/",
  "appsdownload/storage" : "https://jp.example.com/apps/storage"
}
```

EXAMPLE WHERE URL OF SERVER
NEAR MFP IS RETURNED

FIG.31

REQUEST TO ACQUIRE CONNECTION INFORMATION

```
GET /discov?service=appsdownload+discovery&device_id=3F08-00005&region_code=JP&dealer_code=JA5 HTTP/1.1
Host: www.example.com
```

FIG.32

RESPONSE

HTTP/1.1 200 OK
Content-Type: application/json; charset=UTF8

{ "appsdownload" : "https://www.example.com/apps",
"discovery" : [ "https://jp.example.com/discov", "https://us.example.com/discov" ]
}

FIG.39

DISPLAY INFORMATION REQUEST

```
GET /apps?serialId=5R33-00003 HTTP/1.1
Host: www.example.com
Accept-Language: ja-JP
```

FIG.40

RESPONSE

```
HTTP/1.1 200 OK
Content-Type: application/json; charset=UTF-8

[
  {
    "appId": "S002",
    "appType": "install",
    "name": "OCR app",
    "licenseKey": "",
    "description": "OCR on a text document can be performed",
    "version": "1.1",
    "icon": "http://www.example.com/apps/S002/icon.png",
    "licenseInfo": "http://www.example.com/apps/S002/license.html"
  },
  {
    "appId": "S003",
    "appType": "install",
    "name": "Translation app",
    "licenseKey": "S003-555-666",
    "description": "Translation into 5 languages can be performed",
    "version": "2.2",
    "icon": "http://www.example.com/apps/S003/icon.png",
    "licenseInfo": "http://www.example.com/apps/S003/license.html"
  }
]
```

FIG.43

```
// INSTALL
<form name="form1">
    <input type="button" name="install" value="OK" onClick="install('12345', 'S001-111-222')">
</form> function install( appId, licenseKey ){
    appMgmt.install( appId, licenseKey )
}
```

FIG.45

| APP ID | CURRENT VERSION |
|---|---|
| S001 | 1.0 |
| S002 | 1.1 |
| S003 | 2.0 |

FIG.46

| APP ID | DETAIL INFORMATION (VERSION) |
|---|---|
| S001 | 1.1 |
| S002 | 1.1 |
| S003 | 2.2 |

FIG. 48

```
// UPDATE
<form name="form2">
    <input type="button" name="update" value="UPDATE" onClick="update('12345')">
</form> function update( appId ){
    appMgmt.update( appId )
}
```

FIG.51

```
// DELETION
<form name="form3">
    <input type="button" name="uninstall" value="OK" onClick="uninstall('12345', 'S001-111-222')">
</form> function uninstall( appId, licenseKey ){
    uninstall( appId, licenseKey )
}
```

SYSTEM AND INFORMATION PROCESSING METHOD FOR PROVIDING AVAILABLE APPLICATIONS

CROSS-REFERENCE TO RELATED APPLICATIONS

This application is a national phase under 35 U.S.C. § 371 of PCT International Application No. PCT/JP2017/007562 which has an International filing date of Feb. 27, 2017, which claims priority to Japanese Patent Application No. 2016-038046, filed Feb. 29, 2016, the entire contents of each of which are hereby incorporated by reference.

FIELD

The present invention relates to a system and an information processing method.

BACKGROUND

In recent years, there has been wide use of various communication devices, typically mobile phones or information mobile terminals, and therefore the amount of developments in applications available to communication devices has been increasing. To promote use of such applications, there have been developments in websites or applications that make it possible to introduce applications and download or install them in communication devices directly.

According to for example Patent Literature 1, for each of applications stored in a server, an application explanatory page displaying a download button (virtual button) to request the download of the application is provided to a computer device (client device) by the server, and it is displayed on a display unit of the computer device. Then, in the technology disclosed, when the download button on the application explanatory page is selected, download is allowed as long as the selected application is supported by the computer device.

SUMMARY

Technical Problem

Unfortunately, according to the technology disclosed in for example Patent Literature 1, when the server makes changes to display contents on the page (Web page) for introducing applications available to the device, the device needs to also change their programs in accordance with the changes. That is, conventionally, for servers providing pages for introducing applications available to a device (including both a configuration for providing pages and a configuration for providing information necessary to generate pages at the side of the device), there are no systems to generate for example pages having display contents that are different from region to region.

Furthermore, there is no such systems that, when the device makes a request to provide a page for introducing available applications, only applications published at the region where a device is installed are selected and the page is provided to introduce applications available to the device.

The present invention has been made in consideration of the foregoing, and it has an object to provide a system and an information processing method in which, by a server providing a page for introducing applications available to a device, pages with different display contents may be generated and pages for introducing only applications published at the region where a device is installed may be provided.

Solution to Problem

To solve the above-described problem and achieve the object, a system according to the present invention includes a plurality of first servers; and a device connected to each of the first servers via a network, wherein the first server includes a control unit that transmits, to the device in accordance with a request from the device, Web content data including at least display information that includes at least region information indicating a geographical position where the device is installed from the device and that indicates an application available to the device related to the region information, and an application command causing the device to execute processing in connection with the application from the device, and the device includes: a Web browser including a display control unit that performs control to display, on a display unit, a screen based on the Web content data received from the first server, and an executing unit that requests the device to execute processing in connection with the application related to the application command included in the Web content data by executing the application command in accordance with user's operation via the screen; and a processing executing unit that, based on a request from the Web browser, performs processing in connection with the application related to the request.

Advantageous Effects of Invention

According to the present invention, by a server providing a page for introducing applications available to a device, pages with different display contents may be generated and pages for introducing only applications published at the region where a device is installed may be provided.

BRIEF DESCRIPTION OF DRAWINGS

FIG. 5 is a diagram that illustrates an example of first relation information.

FIG. 6 is a diagram that illustrates an example of second relation information.

FIG. 7 is a diagram that illustrates an example of third relation information.

FIG. 8 is a diagram that illustrates an example of fourth relation information.

FIG. 9 is a diagram that illustrates an example of fifth relation information.

FIG. 10 is a diagram that illustrates an example of sixth relation information.

FIG. 13 is a diagram that illustrates an example of seventh relation information.

FIG. 14 is a diagram that illustrates an example of eighth relation information.

FIG. 21 is a diagram that illustrates an example of tenth relation information.

FIG. 27 is a diagram that illustrates an example of the request to acquire the connection information on the server.

FIG. 28 is a diagram that illustrates an example of the connection information on the server.

FIG. 29 is a diagram that illustrates an example of the request to acquire the connection information on each module.

FIG. 30 is a diagram that illustrates an example of the connection information on each module.

FIG. 31 is a diagram that illustrates an example of the request to acquire the connection information on the server and the connection information on the destination providing server.

FIG. 32 is a diagram that illustrates an example of the connection information on the server and pieces of connection information on multiple destination providing servers.

FIG. 39 is a diagram that illustrates an example of the display information request.

FIG. 40 is a diagram that illustrates an example of information received as a response to the display information request.

FIG. 43 is a diagram that illustrates an example of information notified from an executing unit to a processing executing unit.

FIG. 45 is a diagram that illustrates an example of application management information.

FIG. 46 is a diagram that illustrates an example of application detail information.

FIG. 48 is a diagram that illustrates an example of the information notified from the executing unit to the processing executing unit.

FIG. 51 is a diagram that illustrates an example of the information notified from the executing unit to the processing executing unit.

DESCRIPTION OF EMBODIMENTS

With reference to the attached drawings, a detailed explanation is given below of an embodiment of a system and an information processing method according to the present invention. In the following explanation, a multifunction peripheral (MFP), which is one form of an image forming device, is used as an example of a device included in the system; however, this is not a limitation. Here, the multi-function peripheral is a device that has different functions, such as copier function, scanner function, printer function, or fax function.

Figure 1:
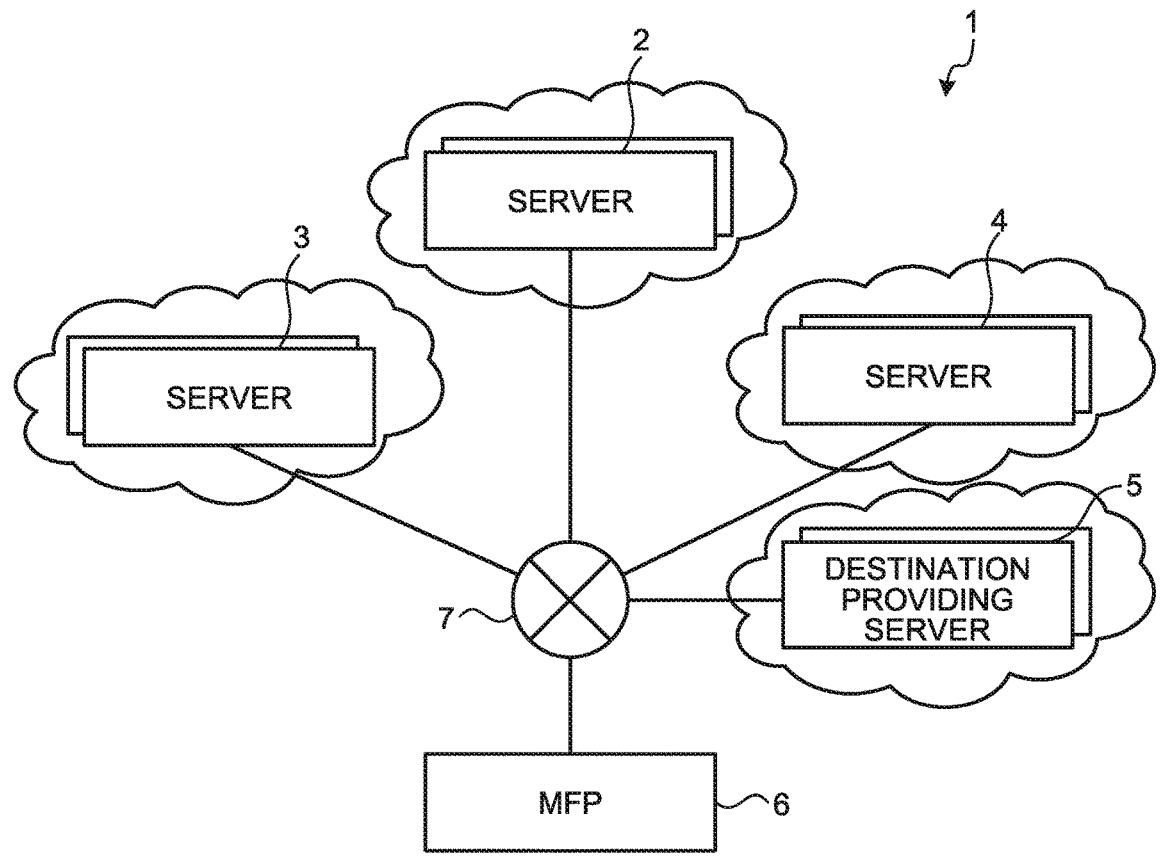
FIG. 1 is a diagram that illustrates an example of the configuration of a system according to the present embodiment.

FIG. 1 is a diagram that illustrates an example of the configuration of a system (information processing system) 1 according to the present embodiment. As illustrated in FIG. 1, the system 1 includes a server 2, a server 3, a server 4, a destination providing server 5, and an MFP 6 connected to the servers 2 to 4 and the destination providing server 5 via a network 7, such as the Internet. Here, the servers 2 to 4 and the destination providing server 5 have a cloud-computing type configuration including a server device group that is made up of multiple servers. The number of servers that constitute the cloud illustrated in FIG. 1 is an example, and this is not a limitation on the number of servers used.

Furthermore, in the example of FIG. 1, only the single MFP 6 is illustrated as a client device included in the system 1 when viewed from the cloud side; however, this is not a limitation, and any number and type of devices may be included in the system 1. For example, a configuration may be such that a PC (personal computer) is included as a client device in the system 1. Furthermore, the three servers 2 to 4 are illustrated as servers (first servers) included in the system 1 by an example; however, this is not a limitation, and any number and type of servers may be included in the system 1. Furthermore, the single destination providing server 5 is illustrated as a destination providing server (second server) included in the system 1 by an example; however, this is not a limitation, and any number and type of destination providing servers may be included in the system 1. Hereafter, the "device" is also referred to as the "MFP". Moreover, a "first server" in claims is equivalent to "the servers 2 to 4", and a "second server" in claims is equivalent to "the destination providing server 5".

The destination providing server 5 transmits the connection information (URL) on the servers 2 to 4 to the MFP 6 in accordance with a request to acquire connection information on the servers 2 to 4 from the MFP 6. In accordance with a request from the MFP 6, the servers 2 to 4 transmit, to the MFP 6, Web content data including display information that includes the information indicating an application available to the MFP 6 and screen information that includes an application command indicating a command for the MFP 6 to execute processing in connection with an application. The servers 2 to 4 are different in only the region indicating the geographical position where the server is installed; therefore, if the servers 2 to 4 do not need to be discriminated, they are referred to as the server 2 below. Here, in the example of FIG. 1, the region of the server 2 is in Japan, the region of the server 3 is in the United States of America, and the region of the server 4 is in Europe. A specific configuration of the server 2 is explained below.

Figure 2:
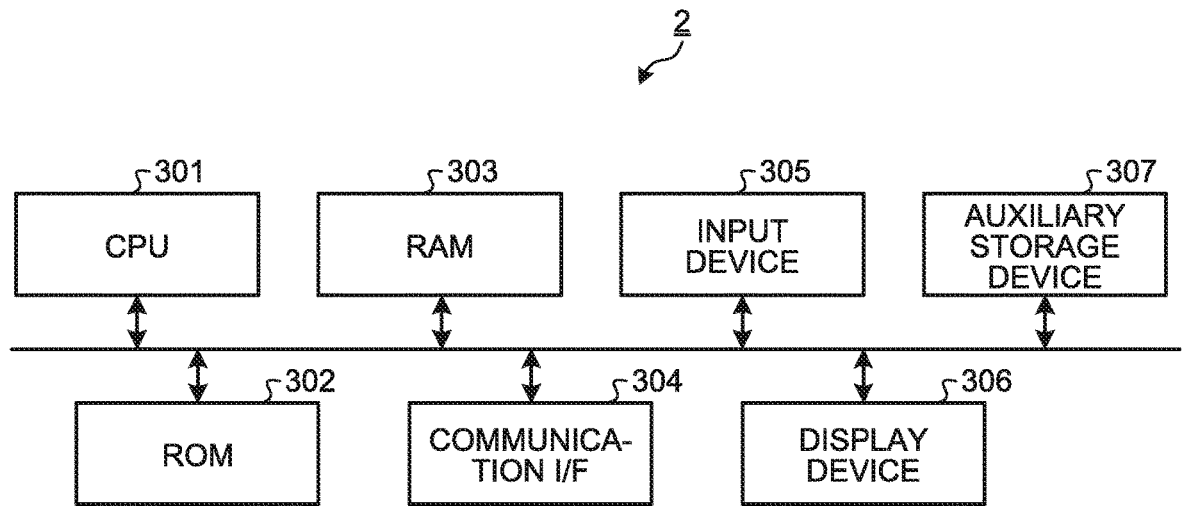
FIG. 2 is a diagram that illustrates an example of the hardware configuration of a server.

FIG. 2 is a diagram that illustrates an example of the hardware configuration of the server 2. As illustrated in FIG. 2, the server 2 includes a CPU 301, a ROM 302, a RAM 303, a communication I/F 304, an input device 305, a display device 306, and an auxiliary storage device 307. The CPU 301 integrally controls operation of the server 2. The ROM 302 is a non-volatile memory that stores various types of data such as programs. The RAM 303 is a volatile memory that serves as a task area (work area) for various types of processing performed by the CPU 301. The communication I/F 304 is an interface for connection with the network 7. The input device 305 is a device that is used for input of operation from users, and it is configured by using, for example, a mouse or a keyboard. The display device 306 is a device that displays various types of information, and it is configured by using, for example, a liquid crystal display device. The auxiliary storage device 307 is configured by using for example an HDD (hard disk drive).

Figure 3:
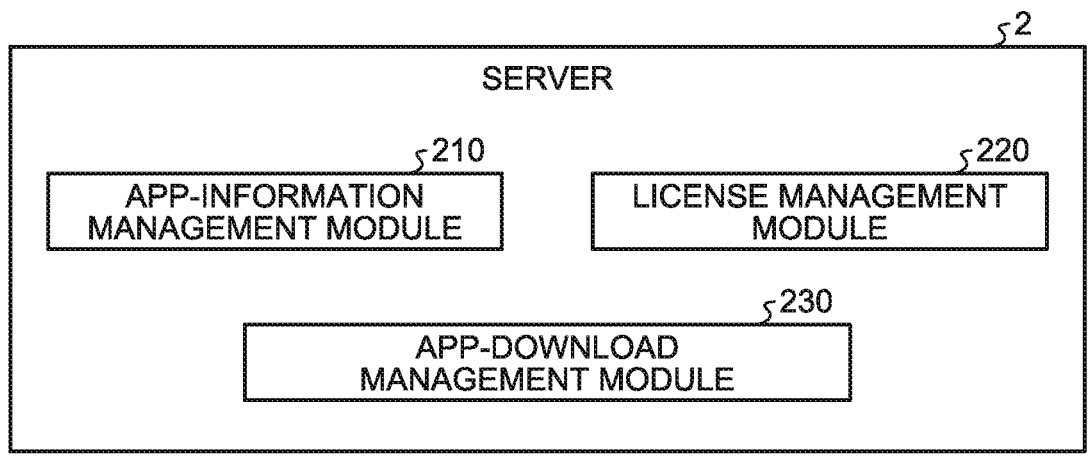
FIG. 3 is a diagram that illustrates an example of functions provided in the server.

FIG. 3 is a diagram that illustrates an example of functions provided in the server 2. As illustrated in FIG. 3, the server 2 includes an app-information management module 210, a license management module 220, and an app-download management module 230. In the example of FIG. 3, only the modules (functions) related to the present embodiment are illustrated; however, modules included in the server 2 are not limited to them.

Figure 4:
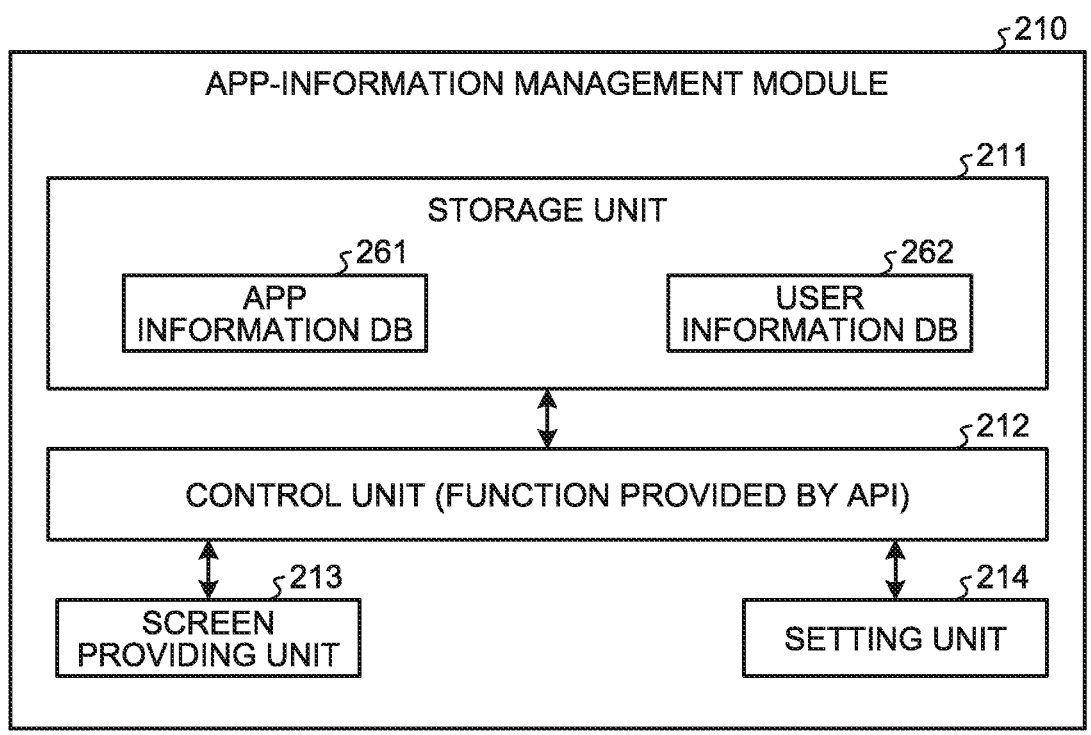
FIG. 4 is a diagram that illustrates an example of functions provided in an app-information management module.

FIG. 4 is a diagram that illustrates an example of functions provided in the app-information management module 210. The app-information management module 210 includes a storage unit 211, a control unit 212, a screen providing unit 213, and a setting unit 214. Here, in the example of FIG. 4, the functions related to the present embodiment are principally illustrated; however, functions provided in the app-information management module 210 are not limited to them.

As illustrated in FIG. 4, the storage unit 211 includes an app information database (hereafter, referred to as the "app information DB") 261 and a user information database (hereafter, referred to as the "user information DB") 262.

The app information DB 261 stores publication state information indicating whether it is a public state and model information for identifying the model of a device to which a corresponding application is available in a related manner with regard to each of applications that are associated with the organization ID for identifying the organization that provides the application that is related to the region information indicating the geographical position where the device (the MFP 6) is installed or dealer-office information indicating the dealer of the device. According to the present embodiment, the app information DB 261 stores first relation information illustrated in FIG. 5, second relation information illustrated in FIG. 6, third relation information illustrated in FIG. 7, fourth relation information illustrated in FIG. 8, fifth relation information illustrated in FIG. 9, and sixth relation information illustrated in FIG. 10.

As illustrated in FIG. 5, the first relation information is information that relates the model ID assigned to each model of the device (the MFP 6), the model name of the device, and the model code ("model information") for identifying the model of the device. Furthermore, the single model ID may be related to multiple model codes. As illustrated in FIG. 6, the second relation information is information that relates the app ID for identifying an application, a license key used for authentication of the right of use (license) of an application, a model ID, version information indicating the latest version of the application identified with a corresponding app ID. Furthermore, in this example, a license key is previously related to the app ID of a free application as license authentication is not necessary; however, a configuration is such that a license key is not related to the app ID of a non-free application as license authentication is necessary.

As illustrated in FIG. 7, the third relation information is information that relates the organization ID assigned to each organization that provides an application, the organization name identified with a corresponding organization ID, the type of a corresponding organization, the region information indicating the geographical position where a corresponding organization is located, and the dealer-office information indicating the dealer of the device (the MFP 6). As illustrated in FIG. 8, the fourth relation information is information that relates an organization ID, an app ID, and publication state information indicating whether an application is in a public state. By combining the first relation information, the second relation information, the third relation information, and the fourth relation information, described above, it can be considered that, with regard to each of applications associated with the organization ID providing the application that is related to the region information or the dealer-office information, the publication state information indicating whether it is in a public state is related to the model information for identifying the model of the device to which the application is available.

Furthermore, as illustrated in FIG. 9, the fifth relation information is information that relates an app ID, language information indicating a language of a country or region where a device is used, the display name of the application identified with a corresponding app ID, and an introductory message for introducing the application identified with a corresponding app ID. In the following explanation, the combination of a display name and an introductory message is sometimes referred to as "app explanatory information" for explaining an application.

Furthermore, as illustrated in FIG. 10, the sixth relation information is information that relates an organization ID, an app ID, language information, the price of the application identified with a corresponding app ID, and price explanation of the application identified with a corresponding app ID. In the following explanation, the combination of price and price explanation is sometimes referred to as "app price information" for explaining the price of an application.

With reference back to FIG. 4, explanation of the storage unit 211 is continued. For example, the user information DB 262 stores information necessary for authentication of a user who is authorized to perform setting operation with the setting unit 214 described later.

Next, a function provided in the control unit 212 is explained. Here, the function provided in the control unit 212 is provided by an application programming interface (API) on the side of the server 2.

Here, for the convenience of explanation, before the function provided in the control unit 212 is explained, a function of the screen providing unit 213 is explained. When receiving a screen information request for requesting screen information from the device (the MFP 6), the screen providing unit 213 generates Web content data (screen information) including at least an application command and transmits Web content data (screen information) as a response to the screen information request to the device (the MFP 6). Web content data (screen information) includes, for example, HTML and CSS, JavaScript (registered trademark), or the like, which is included in HTML (or referred to by the HTML). It is displayed by the Web browser (a display control unit 273 described later) of the device (the MFP 6), and display information is requested to the API (the control unit 212) of the server 2 with the technology called Ajax of JavaScript. For example, when an application command is JavaScript, a configuration may be such that a script itself is embedded in the HTML or a configuration may be such that only a link is described. In this example, a display information request including the model code of the device (the MFP 6), which is a transmission source, to request display information is transmitted to the control unit 212. Types of an application command according to the present embodiment include install commands, update commands, and uninstall commands. Install commands indicate commands for installing an application. Update commands indicate commands for updating an application. Uninstall commands indicate commands for deleting an installed application to set the state of the MFP 6 to the previous state before the application was installed.

Figure 11:
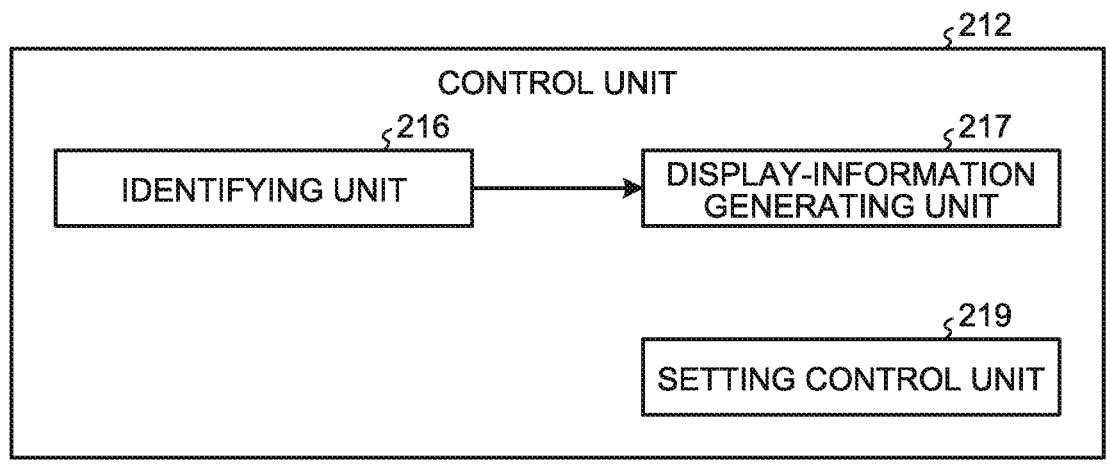
FIG. 11 is a diagram that illustrates an example of functions provided in a control unit.

FIG. 11 is a diagram that illustrates an example of functions provided in the control unit 212. As illustrated in FIG. 11, the control unit 212 includes an identifying unit 216, a display-information generating unit 217, and a setting control unit 219.

When receiving, from the device (the MFP 6), the display information request including at least the region information indicating the geographical position where the device is installed and the model code for identifying the model of the device to request the display information, the identifying unit 216 refers to information stored in the storage unit 211 (in this example, the app information DB 261) to identify the application that is related to the combination of the region information included in the display information request, the model code, and the publication state information indicating a public state with the organization ID associated with the region information. More specifically, when receiving the display information request from the device, the identifying unit 216 refers to the third relation information illustrated in FIG. 7 to select the organization ID related to the region information or the dealer-office information included in the received display information request. Here, when the dealer-office information is included, the organization ID related to the dealer-office information is preferentially selected, and when no dealer-office information is included, the organization ID related to the region information is selected. Then, the identifying unit 216 refers to the fourth relation information illustrated in FIG. 8 to select the app ID related to the publication state information indicating a public state among one or more app IDs that are related to the selected organization ID. Then, the identifying unit 216 refers to the first relation information illustrated in FIG. 5 to select the model ID related to the model code included in the received display information request. Then, the identifying unit 216 refers to the second relation information illustrated in FIG. 6 to select one or more app IDs related to the selected model ID. Then, the identifying unit 216 compares a public app ID among one or more app IDs related to the organization ID selected in FIG. 8 with one or more app IDs related to the model ID selected in FIG. 6, thereby identifying an identical app ID. The application identified with the app ID, specified as described above, is identified as an application that is related to the combination of the region information included in the display information request received from the device (the MFP 6), the model code, and the publication state information indicating a public state with the organization ID associated with the region information (that is, as an application available to the device that is the requester of the display information request).

Furthermore, as the display information request according to the present embodiment includes language information (locale information) indicating the language of the country or region where the device, which is the requester of the display information request, is used, the identifying unit 216 refers to the fifth relation information illustrated in FIG. 9 to identify the app explanatory information that is related to the combination of the app ID identified as described above and the language information included in the display information request received from the device. Similarly, the display information request according to the present embodiment includes language information (locale information) indicating the language of the country or region where the device, which is the requester of the display information request, is used, the identifying unit 216 refers to the sixth relation information illustrated in FIG. 10 to identify the app price information that is related to the combination of an app ID for each organization ID identified as described above and the language information included in the display information request received from the device. Here, the above-described language information is typically described in an HTTP Accept-Language header.

Explanation of FIG. 11 is continued. The display-information generating unit 217 generates Web content data (display information) indicating the application identified by the identifying unit 216 and transmits the generated Web content data (display information) as a response to the display information request to the device (the MFP 6). For each application (e.g., each app ID) available to the device (the MFP 6) that is the requester of the display information request, Web content data (display information) according to the present embodiment includes application detail information in which detail information indicating details of a corresponding application is related. Detail information includes a license key, version information, app explanatory information, app price information, and the like.

The setting control unit 219 performs control to apply the settings made by the setting unit 214 to the information stored in the storage unit 211. Specifically, the setting control unit 219 performs control to update information stored in the storage unit 211 in accordance with settings of the setting unit 214. In this example, the setting unit 214 has the function to variably set display information in accordance with user's operation. For example, the setting unit 214 is capable of variably setting app explanatory information, app price information, or layout information indicating layout of display components on the screen, or the like, in accordance with user's operation. Thus, display contents are different depending on for example each region.

The function of each of the control unit 212, the screen providing unit 213, and the setting unit 214 described above may be implemented when the CPU 301 executes programs stored in a storage device such as the ROM 302. Furthermore, the above-described storage unit 211 may be implemented by using the auxiliary storage device 307 such as the ROM 302 or an HDD. In this example, it may be considered that the combination of the control unit 212 and the screen providing unit 213 is equivalent to the function ("the control unit") for transmitting Web content data made up of the display information indicating an application available to the device (the MFP 6) and the screen information including at least an application command in accordance with a request from the device (the MFP 6).

Figure 12:
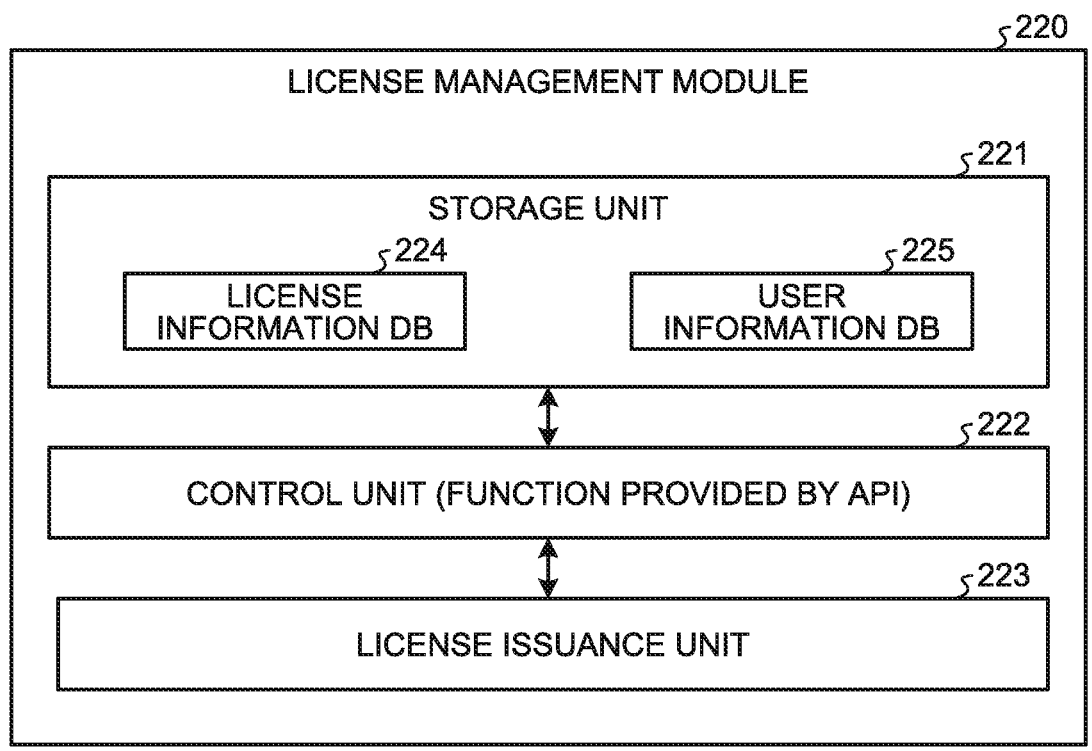
FIG. 12 is a diagram that illustrates an example of functions provided in a license management module.

Next, functions provided in the license management module 220 are explained. FIG. 12 is a diagram that illustrates an example of functions provided in the license management module 220. As illustrated in FIG. 12, the license management module 220 includes a storage unit 221, a control unit 222, and a license issuance unit 223. Here, although the example of FIG. 12 principally illustrates the functions related to the present embodiment, functions provided in the license management module 220 are not limited to them.

As illustrated in FIG. 12, the storage unit 221 includes a license information database (hereafter, referred to as the "license information DB") 224 and a user information database (hereafter, referred to as the "user information DB") 225.

For each of applications, the license information DB 224 stores information about the right of use (license) of a corresponding application in a related manner. According to the present embodiment, the license information DB 224 stores seventh relation information illustrated in FIG. 13, eighth relation information illustrated in FIG. 14, and ninth relation information illustrated in FIG. 15.

Figures 15, 16:
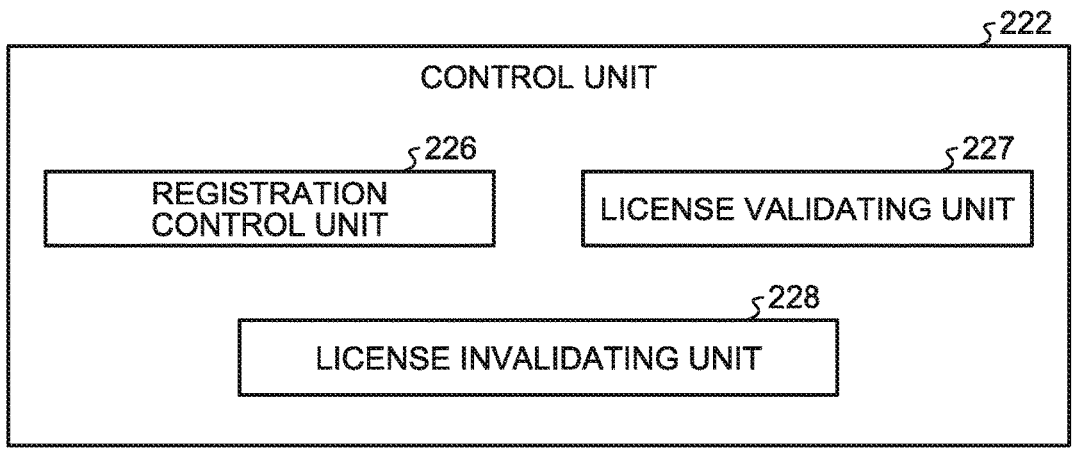
FIG. 15 is a diagram that illustrates an example of ninth relation information.
FIG. 16 is a diagram that illustrates an example of functions provided in the control unit.

As illustrated in FIG. 13, the seventh relation information is information that relates an app ID, a license type indicating the type of a license, a license form indicating the form of a license (in this example, any of non-free, free, and trial), a period of validity indicating a period during which a license is valid, and a volume indicating the number to which a license may be assigned. Furthermore, as illustrated in FIG. 14, the eighth relation information is information that relates a license type, a license key, an in-use license number indicating the number of licenses in use, and a used license number indicating the number of used licenses. Furthermore, as illustrated in FIG. 15, the ninth relation information is information that relates a license key, a device number, a period of validity, and validity state information indicating whether a license is valid or invalid.

With reference back to FIG. 12, explanation of the storage unit 221 is continued. For example, the user information DB 225 stores information necessary for authentication of a user to perform operation to issue a license. The user information DB 225 may be common to the user information DB 262 in the app-information management module 210.

Next, functions provided in the control unit 222 are explained. Here, the functions provided in the control unit 222 are provided by an application programming interface (API) at the side of the server 2. FIG. 16 is a diagram that illustrates an example of functions provided in the control unit 222. As illustrated in FIG. 16, the control unit 222 includes a registration control unit 226, a license validating unit 227, and a license invalidating unit 228.

The registration control unit 226 performs control to register information about a license issued by the license issuance unit 223 in the storage unit 221 (the license information DB 224). According to the present embodiment, when receiving operation to select the app ID of the target application for which a license is to be issued and the license type from the user who has the right to perform operation to issue a license, the license issuance unit 223 issues the license key that is related to the app ID and the license type selected by the received operation. Furthermore, a configuration may be such that the license issuance unit 223 only generates the UI that is described in HTML, or the like, and the control unit 222 performs the function to issue a license in accordance with a user's operation. The registration control unit 226 performs control to register information indicating a license key issued by the license issuance unit 223 and the license type that is related to the license key in the license information DB 224. More specifically, when receiving the license key and the license type that is related to the license key from the license issuance unit 223, the registration control unit 226 adds a new record (unit information, in this example, information in units of lines) including the received license key and license type to the eighth relation information illustrated in FIG. 14.

The license validating unit 227 performs control to validate a license in accordance with a request from the device (the MFP 6). In this example, when receiving a validation request including at least an app ID, a license key, and a device number to request validation of a license from the device (the MFP 6), the license validating unit 227 checks whether the license key included in the received validation request is present in the eighth relation information (see FIG. 14) stored in the license information DB 224. When a check result is positive, the license validating unit 227 refers to the seventh relation information (see FIG. 13) stored in the license information DB 224 and determines the period of validity related to the app ID included in the received validation request. Then, to the ninth relation information illustrated in FIG. 15, a new record is added in which the license key and the device number included in the received validation request, the determined period of validity, and the validity state information indicating validity are related. Furthermore, the license validating unit 227 refers to the eighth relation information illustrated in FIG. 14 and increments the in-use license number related to the license key included in the validation request received from the device (the MFP 6) by "1" to update it. Then, the license validating unit 227 transmits a message that a license is in a valid state as a response to the validation request to the device (the MFP 6). After receiving this notification, the device (the MFP 6) is allowed to use the application identified with the app ID included in the validation request.

Furthermore, for example, when the license key included in the validation request received from the device (the MFP 6) is not present in information stored in the license information DB 224 or when the volume that is related to the license key included in the validation request received from the device (the MFP 6) has already reached the upper limit, the license validating unit 227 returns an error to the validation request from the device (the MFP 6).

The license invalidating unit 228 performs control to invalidate a license in accordance with a request from the device (the MFP 6). In this example, when receiving an invalidation request including at least a license key and a device number to request invalidation of a license from the device (the MFP 6), the license invalidating unit 228 refers to the ninth relation information (see FIG. 15) stored in the license information DB 224 and changes the validity state information related to the combination of the license key and the device number included in the received invalidation request to the information indicating invalidity. Furthermore, it refers to the eighth relation information (see FIG. 14) stored in the license information DB 224, decrements the in-use license number related to the license key included in the invalidation request received from the device (the MFP 6) by "1", and increments the used license number by "1", thereby updating it. Then, the license invalidating unit 228 transmits a message that the license is in an invalid state as a response to the invalidation request to the device (the MFP 6). After receiving this notification, the device (the MFP 6) is not allowed to use the application identified with the app ID included in the invalidation request.

The function of each of the control unit 222 and the license issuance unit 223 described above may be implemented when the CPU 301 executes programs stored in a storage device such as the ROM 302. Furthermore, the above-described storage unit 221 may be implemented by using the auxiliary storage device 307 such as the ROM 302 or an HDD.

Figure 17:
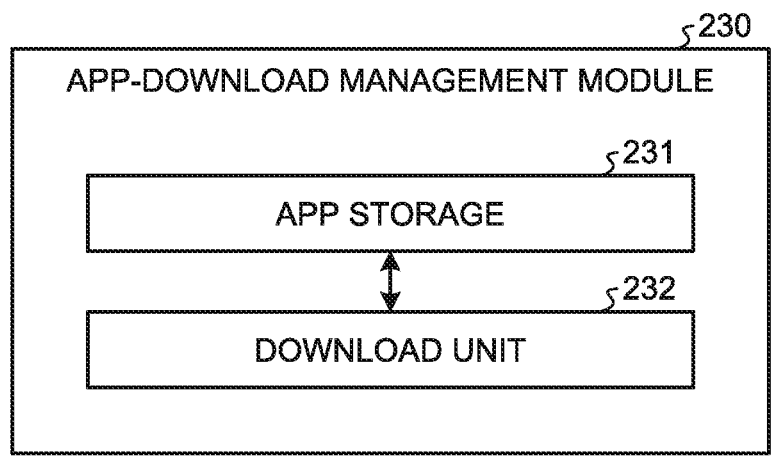
FIG. 17 is a diagram that illustrates an example of functions provided in an app-download management module.

Next, functions provided in the app-download management module 230 are explained. FIG. 17 is a diagram that illustrates an example of functions provided in the app-download management module 230. As illustrated in FIG. 17, the app-download management module 230 includes app storage 231 and a download unit 232. Here, although the example of FIG. 17 principally illustrates the functions related to the present embodiment, functions provided in the app-download management module 230 are not limited to them.

The app storage 231 stores multiple applications to be provided to the device (the MFP 6). In this example, for each of app IDs, the app storage 231 stores a data file including an application main body in a related manner. The download unit 232 performs control to transmit (download) any application stored in the app storage 231 to the MFP 6 in accordance with a request from the device (the MFP 6). In this example, when receiving a download request including at least an app ID to request the download of an application from the device (the MFP 6), the download unit 232 transmits the application that is related to the app ID included in the received download request to the device (the MFP 6). More specifically, the download unit 232 refers to the app storage 231, identifies the data file that is related to the app ID included in the download request received from the device (the MFP 6), and transmits the identified data file to the device (the MFP 6).

The above-described function of the download unit 232 may be implemented when the CPU 301 executes a program stored in a storage device such as the ROM 302. Furthermore, the above-described app storage 231 may be implemented by using the auxiliary storage device 307 such as the ROM 302 or an HDD.

Figure 18:
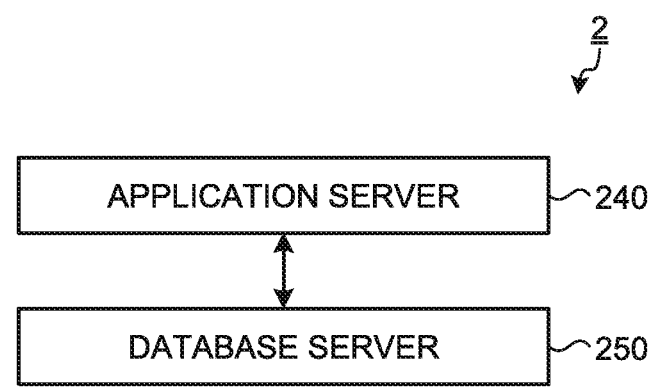
FIG. 18 is a diagram that illustrates a modification of a server.

The configuration of the server 2 is as described above. Furthermore, as illustrated in FIG. 1, a configuration may be such that the server 2 is made up of multiple servers. For example, as illustrated in FIG. 18, a configuration may be such that the server 2 is made up of an application server 240 and a database server 250. For example, a configuration may be such that the application server 240 includes the control unit 212, the screen providing unit 213, the setting unit 214, the control unit 222, and the license issuance unit 223, described above. Furthermore, for example, a configuration may be such that the application server 240 is made up of multiple servers and each of the control unit 212, the screen providing unit 213, the setting unit 214, the control unit 222, the license issuance unit 223, and the download unit 232, described above, is installed in any of the servers in a distributed manner.

Furthermore, for example a configuration may be such that the database server 250 includes the storage unit 211 and the storage unit 221, described above. Furthermore, for example a configuration may be such that the database server 250 is made up of multiple servers and each of the app information DB 261, the user information DB 262, the license information DB 224, the user information DB 225, and the app storage 231 is installed in any of the servers in a distributed manner.

Furthermore, as explained in the example of FIG. 1, for example, the region of the server 2 is in Japan, the region of the server 3 is in America, and the region of the server 4 is in Europe. In such a case, the configurations of the above-described servers 2 to 4 may be all the same configuration. Furthermore, for example, a configuration may be such that only the server 2 (Japan) includes a license management module and the server 3 (America) and the server 4 (Europe) do not include a license management module. Moreover, for example, a configuration may be such that the server 2 (Japan) and the server 4 (Europe) include the application server 240 and the database server 250, and the server 3 (America) does not include the application server 240 or the database server 250.

Furthermore, for example the servers 2 to 4 may include the app-download management module 230 to improve responsiveness and for example the server 2 (Japan) may include the license management module 220 for intensive management in one place. Furthermore, the server 2 (Japan) and the server 4 (Europe) may include the app-information management module 210 in terms of improvement in responsiveness or data protection and the server 2 (Japan) may include a submodule (the setting unit 214) of the app-information management module 210 to improve task efficiency.

Figure 19:
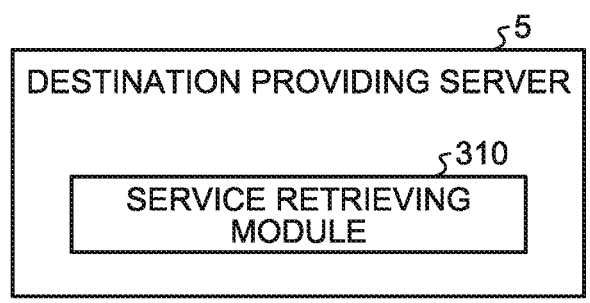
FIG. 19 is a diagram that illustrates an example of a function provided in a destination providing server.

Next, a functional configuration of the destination providing server 5 is explained. As an example of the hardware configuration of the destination providing server 5 is the same as an example of the hardware configuration of the server 2, explained above with reference to FIG. 2, detailed explanations are omitted. FIG. 19 is a diagram that illustrates an example of a function provided in the destination providing server 5. As illustrated in FIG. 19, the destination providing server 5 includes a service retrieving module 310. Although the example of FIG. 19 illustrates only the module (function) related to the present embodiment, a module provided in the destination providing server 5 is not limited to it.

Figure 20:
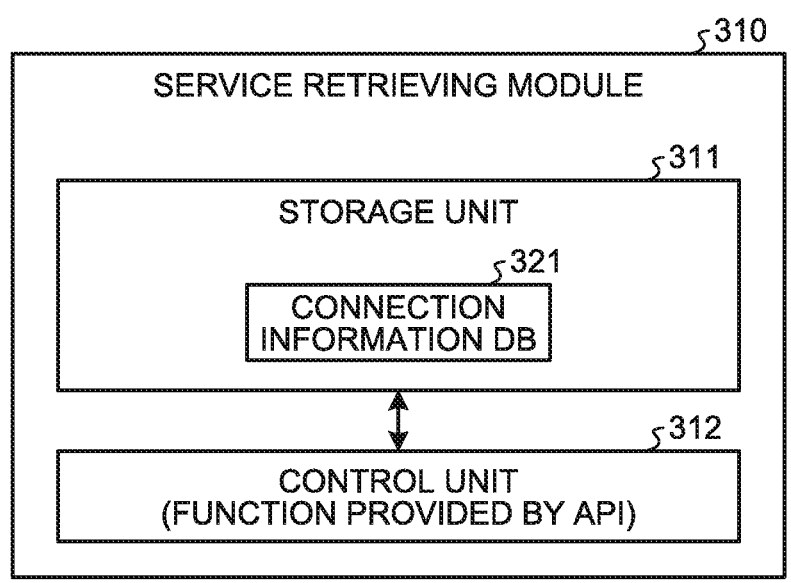
FIG. 20 is a diagram that illustrates an example of the functions provided in a service retrieving module.

FIG. 20 is a diagram that illustrates an example of the functions provided in the service retrieving module 310. The service retrieving module 310 includes a storage unit 311 and a control unit 312. Here, although the example of FIG. 20 principally illustrates the functions related to the present embodiment, the functions provided in the service retrieving module 310 are not limited to them.

As illustrated in FIG. 20, the storage unit 311 includes a connection information database (hereafter, referred to as "connection information DB") 321.

The connection information DB 321 stores at least information that relates the organization ID assigned to each organization providing an application, the region information indicating the geographical position where a corresponding organization is located, and the dealer-office information indicating the dealer of the device (the MFP 6).

The connection information DB 321 stores at least information in which the organization ID related to the region information indicating the geographical position where the device (the MFP 6) is installed or the dealer-office information indicating the dealer of the device (the MFP 6) is related to the connection information on the server 2 providing an application.

Furthermore, the connection information DB 321 stores at least information that relates the device information (device number) for identifying the device (the MFP 6) and the connection information on the server providing an application. According to the present embodiment, the connection information DB 321 stores the third relation information illustrated in FIG. 7, tenth relation information illustrated in FIG. 21, and eleventh relation information illustrated in FIG. 22. Here, the connection information DB 321 may store either one, the third relation information and the tenth relation information or the eleventh relation information.

As illustrated in FIG. 21, the tenth relation information is information that relates the organization ID assigned to each organization providing an application with the connection information on the server providing an application published by the organization identified with the organization ID. The third relation information illustrated in FIG. 7 and the tenth relation information illustrated in FIG. 21 are used so that, based on the region information on the device (the MFP 6) installed or the dealer-office information, it is possible to identify the connection information (URL) on the server providing an application published by the organization identified with the organization ID related to the region information or the dealer-office information. Thus, the destination providing server 5 is connectable to the server that is located closest to the device (the MFP 6).

Figures 22, 23:
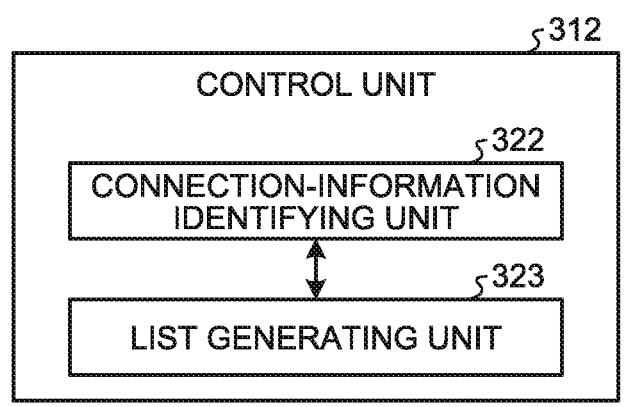
FIG. 22 is a diagram that illustrates an example of eleventh relation information.
FIG. 23 is a diagram that illustrates an example of functions provided in a control unit.

As illustrated in FIG. 22, the eleventh relation information is information that relates the device number for identifying the device (the MFP 6) with the connection information on the server providing an application. By using the eleventh relation information, the connection information (URL) on the server providing an application may be identified based on the device number. Thus, when the connection information on the server providing an application is managed with regard to each device number, the destination providing server 5 is capable of establishing connection with a predetermined server related to the device number of the device (the MFP 6). For example, to specially connect only a specific device to a predetermined server, i.e., to connect the device (the MFP 6) to the server near the position where the device (the MFP 6) is installed although the region information (region code) or the dealer-office information (dealer office code) is set based on the location of the head office in which a contract has been made for a user of a company that has a foothold in multiple countries, the eleventh relation information is used so that the destination providing server 5 is connectable to a predetermined server related to the device number of the device (the MFP 6). In this way, when receiving a connection-information acquisition request including at least region information or dealer-office information and device information (device number) from the device (the MFP 6), the destination providing server 5 is capable of identifying predetermined connection information for each device (the MFP 6) regardless of the region information or the dealer-office information.

The tenth relation information and the eleventh relation information described above are used in such a manner that for example typically the connection information (URL) on the server providing an application published by the organization identified with the organization ID related to the region information (region code) on the device (the MFP 6) installed or the dealer-office information (dealer office code) is identified by using the tenth relation information based on the region information or the dealer-office information and, when only a specific device needs to be connected to a predetermined server, a predetermined server related to the device number of the device (the MFP 6) is identified by using the eleventh relation information. Furthermore, it is possible that when a device number is registered in the eleventh relation information illustrated in FIG. 22, the connection information on the server is identified by using the eleventh relation information and, when a device number is not registered in the eleventh relation information, the connection information on the server is identified based on the region information or the dealer-office information by using the tenth relation information.

Next, a function provided in the control unit 312 is explained. In accordance with a connection-information acquisition request including at least the region information indicating the geographical position where the device (the MFP 6) is installed or the dealer-office information indicating the dealer of the device (the MFP 6) and the device information (device number) for identifying the device (the MFP 6) to request acquisition of the connection information on the server 2 from the device (the MFP 6), the control unit 312 performs control so as to refer to information stored in the storage unit 311, identify the connection information on the server 2, and transmit the connection information on the server 2 to the device (the MFP 6). Here, the function provided in the control unit 312 is provided by the application programming interface (API) at the side of the destination providing server 5.

FIG. 23 is a diagram that illustrates an example of functions provided in the control unit 312. As illustrated in FIG. 23, the control unit 312 includes a connection-information identifying unit 322 and a list generating unit 323.

First, division of roles of the connection-information identifying unit 322 and the list generating unit 323 is explained. According to the present embodiment, the connection-information identifying unit 322 identifies the connection information (URL) on the server 2 and transfers it to the list generating unit 323, the list generating unit 323 generates connection list information (list) of connection information on multiple servers arranged in accordance with a predetermined condition and transfers it to the connection-information identifying unit 322, and the connection-information identifying unit 322 transmits the connection list information of the connection information (the connection list information of the connection information on the server 2) to the device (the MFP 6). Furthermore, the predetermined condition may be optionally set. Furthermore, according to the present embodiment, there is a case where the connection-information identifying unit 322 identifies single piece or multiple pieces of connection information (URL) on the servers 2. When there is single piece of connection information (URL) on the server 2, the list generating unit 323 generates connection list information (list) with single piece of connection information (URL). Furthermore, when there are multiple pieces of connection information (URL) on the servers 2, the list generating unit 323 generates connection list information (list) with multiple pieces of connection information (URL) arranged in accordance with a predetermined condition. Here, "the connection-information identifying unit" has the function of a "connection-information transmitting unit" in claims. Hereafter, the connection list information is also referred to as a "list".

Furthermore, according to a modification of the present embodiment, connection list information (list) of connection information on multiple servers generated by the list generating unit 323 may be transmitted from the list generating unit 323 to the device (the MFP 6). In this case, the connection-information identifying unit 322 identifies the connection information (URL) on the server 2 and transfers it to the list generating unit 323, the list generating unit 323 generates the connection list information (list) of the connection information on multiple servers arranged in accordance with a predetermined condition, and the list generating unit 323 transmits the connection list information of the connection information (the connection list information of the connection information on the server 2) to the device (the MFP 6).

(In the Case of Single Piece of Connection Information)

The connection-information identifying unit 322 receives a connection-information acquisition request including at least the region information or the dealer-office information and the device information (device number) for identifying the device (the MFP 6) to request acquisition of the connection information on the server 2 from the device (the MFP 6), refers to information stored in the storage unit 311 (in this example, the connection information DB 321), identifies the connection information (URL) on the server 2 providing an application published by the organization identified with the organization ID that is related to the region information or the dealer-office information included in the request to acquire the connection information on the server 2, transfers the connection information (URL) on the server 2 to the list generating unit 323, receives the list of connection information (URL) generated by the list generating unit 323, and transmits it to the device (the MFP 6). Specifically, when receiving a connection-information acquisition request of the server 2 from the device (the MFP 6), the connection-information identifying unit 322 refers to the third relation information illustrated in FIG. 7 and selects the organization ID related to the region information or the dealer-office information included in the received connection-information acquisition request of the server 2. For example, when the connection-information acquisition request of the server 2 includes region information "JP", the connection-information identifying unit 322 selects organization ID "O0002". Furthermore, when the dealer-office information is included, the organization ID related to the dealer-office information is preferentially selected and, when the dealer-office information is not included, the organization ID related to the region information is selected. Then, in the tenth relation information illustrated in FIG. 21, the connection-information identifying unit 322 identifies the connection information (in this example, the connection information on the organization ID "O0002" (Japan office), https://jp.example.com/apps) on the server 2 providing an application published by the organization identified with the selected organization ID and transfers the identified connection information (https://jp.example.com/apps) on the server 2 to the list generating unit 323. Then, the connection-information identifying unit 322 receives the connection list information (list) of the connection information (URL) generated by the list generating unit 323 and transmits it to the device (the MFP 6). Here, when a parameter of the connection-information acquisition request includes a request to acquire the connection information on its own (the destination providing server 5), the connection-information identifying unit 322 transmits the list of connection information (URL) and the connection information (https://jp.example.com/apps/discov) on its own (the destination providing server 5) together to the device (the MFP 6). Furthermore, a parameter of a connection-information acquisition request specifies whether each piece of connection information is to be transmitted or not. The parameter is a "service" parameter in a request to acquire connection information illustrated in FIG. 27 described later. In accordance with the parameter in a connection-information acquisition request, each piece of connection information (URL) is transmitted to the device (the MFP 6).

(In the Case of Multiple Pieces of Connection Information)

Furthermore, after identifying the connection information (URL) on the server 2 with the organization ID related to the region information or the dealer-office information, the connection-information identifying unit 322 further identifies the organization ID that is geographically close to the region information on the server 2. Then, the connection information (URL) on the server with the geographically close organization ID is identified. In this way, the identified pieces of connection information (URL) on multiple servers are transferred to the list generating unit 323. Specifically, when the dealer-office information included in a request to acquire the connection information on the server 2 is for example "JA5", the third relation information in FIG. 7 is referred to so that the organization ID "O0005" is identified, and the tenth relation information in FIG. 21 is referred to so that the connection information (https://ja5.jp.example.com/apps) on the organization ID "O0005" is identified. Then, the organization IDs "O0006" and "O0002" having the same region information as the region information "JP" on the organization ID "O0005" are identified in the third relation information of FIG. 7, and the tenth relation information in FIG. 21 is referred to so that the connection information (https://ja6.jp.example.com/apps) on the organization ID "O0006" and the connection information (https://jp.example.com/apps) on "O0002" are identified. Then, the connection-information identifying unit 322 transfers the identified pieces of connection information (URL) on the organization IDs "O0005", "O0006", and "O0002" to the list generating unit 323. Furthermore, when the region information included in a request to acquire the connection information is for example "EU", the third relation information in FIG. 7 is referred to so that the organization ID "O0004" is identified, and the tenth relation information in FIG. 21 is referred to so that the connection information (https://eu.example.com/apps) on the organization ID "O0004" is identified. In the third relation information of FIG. 7, there are no organization IDs with the same region information as the region information "EU" on the organization ID "O0004", the organization IDs "O0003", "O0007", "O0002", "O0005", and "O0006" having different region information such as the region information "US" or "JP" are identified, and the tenth relation information in FIG. 21 is referred to so that the pieces of connection information (URL) on the organization IDs "O0003", "O0007", "O0002", "O0005", and "O0006" are identified. Then, the connection-information identifying unit 322 transfers the identified pieces of connection information (URL) on the organization IDs "O0003", "O0007", "O0002", "O0005", and "O0006" to the list generating unit 323. Then, the connection-information identifying unit 322 receives the list of connection information (URL) generated by the list generating unit 323 and transmits it to the device (the MFP 6).

In the above explanation, when the pieces of connection information on multiple servers are identified, the connection-information identifying unit 322 identifies the connection information (URL) on the server with the organization ID that is geographically close to the region information included in a request to acquire the connection information; however, this is not a limitation, and the connection information (URL) on a server having the organization ID with different region information may be identified, or the connection information (URL) on a server having the organization ID with all region information may be identified.

Here, additional explanation is given of "geographically close" and "far". In a network system, response performance (network delay) is not always relevant to a geographical position. For example, as communications between Japan and Europe are often routed through America, the communication distance between Japan and Europe is longer than that between Japan and America. Therefore, when a connection-information acquisition request for the server 2 is accessed from Japan, they are identified in order of Japan→America→Europe, and a list is generated. When a connection-information acquisition request for the server 2 comes from America, they are identified in order of America→Europe→Japan, and a list is generated. Furthermore, when a connection-information acquisition request for the server 2 comes from Europe, they are identified in order of Europe→America→Japan, and a list is generated. However, with regard to accesses from Europe, as there is a tendency to avoid communications with America, a list may be generated in order of only Europe→Japan. Here, a system regarding the setting of the order is optional.

(In the Case of Predetermined Connection Information)

Furthermore, it is also possible that, when receiving a connection-information acquisition request for the server 2 from the device (the MFP 6), the connection-information identifying unit 322 refers to information stored in the storage unit 311 (in this example, the connection information DB 321), identifies the connection information (URL) on the server providing the application that is related to the device number included in the connection-information acquisition request for the server 2, and transmits the connection information on the server to the device (the MFP 6). More specifically, when a connection-information acquisition request for the server 2 is received from the device (the MFP 6), if the device number is registered in the eleventh relation information illustrated in FIG. 22 (in this example, when the device number "3F08-00001" is registered), the connection-information identifying unit 322 identifies the connection information (https://jp.example.com/apps) on the server providing an application and transfers the identified connection information (URL) on the server to the list generating unit 323. Then, the connection-information identifying unit 322 receives the connection list information (list) of the connection information (URL) generated by the list generating unit 323 and transmits it to the device (the MFP 6).

(List of Connection Information on Server)

Explanation of FIG. 23 is continued. As described above, the list generating unit 323 receives connection information on one server or pieces of connection information on multiple servers from the connection-information identifying unit 322. When there is one piece of connection information on the server 2, the list generating unit 323 generates a list having one piece of connection information on the server and transfers it to the connection-information identifying unit 322. Furthermore, when there are multiple pieces of connection information on the servers 2, the list generating unit 323 generates a list of pieces of connection information on the servers, in which they are arranged in order, starting from the connection information that is geographically close to the region information on the device (the MFP 6) installed to the geographically far connection information among the pieces of connection information on the servers, received from the connection-information identifying unit 322, and transfers it to the connection-information identifying unit 322. That is, as described above, the list generating unit 323 generates connection list information (list) of multiple pieces of connection information on the servers 2, in which they are arranged in order, starting from the connection information with a short time required for communication with the device (the MFP 6) to the connection information with a long time required for the communication among the pieces of connection information on the servers 2 that are identified by the connection-information identifying unit 322, and transfers it to the connection-information identifying unit 322. Furthermore, according to a modification of the above-described present embodiment, it is also possible that the list generating unit 323 generates connection list information (list) of the pieces of connection information on the servers that are arranged in accordance with a predetermined condition and the list generating unit 323 transmits the connection list information of the pieces of connection information (the connection list information of the pieces of connection information on the servers 2) to the device (the MFP 6).

(List of Pieces of Connection Information on Destination Providing Servers)

Furthermore, when there are multiple destination providing servers, the list generating unit 323 generates a list of pieces of connection information on multiple servers and also generates a list of pieces of connection information on the destination providing servers. Then, the two generated lists (the list of pieces of connection information on the servers and the list of pieces of connection information on the destination providing servers) are transferred to the connection-information identifying unit 322. Here, generation of the two lists is designated as a parameter of the connection-information acquisition request as described above. The parameter is the "service" parameter in the request to acquire the connection information illustrated in FIG. 27 described later. Here, the list generating unit 323 generates a list of pieces of connection information on the destination providing servers, in which they are sequentially arranged starting from the connection information that is geographically close to the region information on the device (the MFP 6) installed to the geographically far connection information among the pieces of connection information on the destination providing servers; however, this is not a limitation, and the list has any order. For example, as described above, the list generating unit generates connection list information (list) of pieces of connection information on the destination providing servers, in which they are sequentially arranged starting from the connection information with a short time required for communication with the device (the MFP 6) to the connection information with a long time required for the communication among the pieces of connection information on the destination providing servers. Furthermore, according to a modification of the above-described present embodiment, it is also possible that the list generating unit 323 generates connection list information (list) of the pieces of connection information on the destination providing servers that are arranged in accordance with a predetermined condition and the list generating unit 323 transmits the connection list information of the pieces of connection information (the connection list information of the pieces of connection information on the destination providing servers 5) to the device (the MFP 6).

The configuration of the destination providing server 5 is described above. With regard to the region where the destination providing server 5 is installed, the destination providing server 5 may be installed in each of the regions where the server 2 (Japan), the server 3 (America), and the server 4 (Europe) are installed, as explained in the example of FIG. 1, or the multiple destination providing servers 5 may be installed in a region where there is a large number of users, e.g., Japan.

Figure 24:
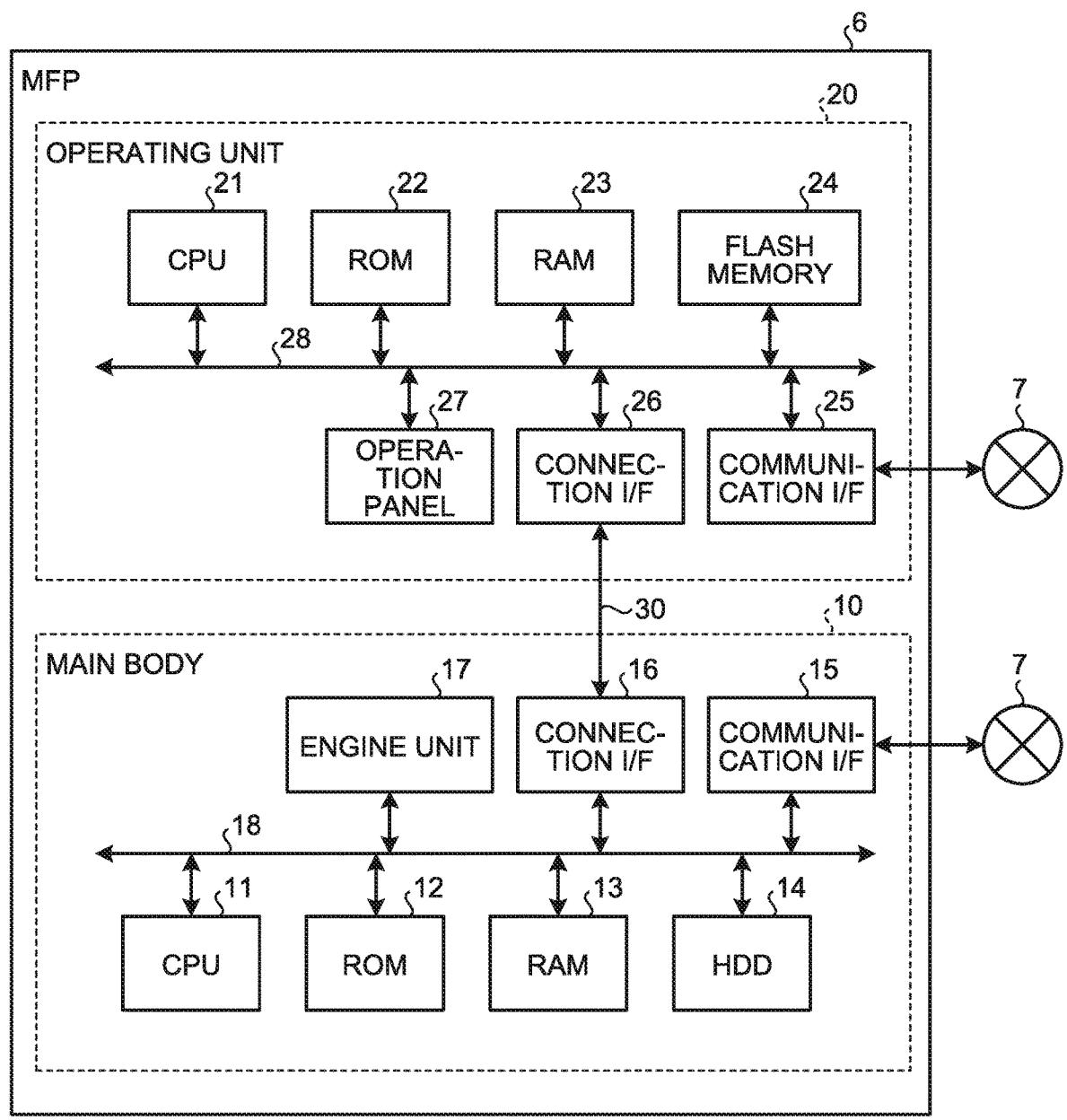
FIG. 24 is a block diagram that illustrates an example of the hardware configuration of an MFP.

Next, with reference to FIG. 24, a hardware configuration of the MFP 6 is explained. As illustrated in FIG. 24, the MFP 6 includes a main body 10 that is capable of implementing various functions, such as copier function, scanner function, fax function, or printer function; and an operating unit 20 that receives user's operation. Here, receiving user's operation is an idea including receiving information (including signals, and the like, indicating coordinate values on the screen) input in accordance with user's operation. The main body 10 and the operating unit 20 are connected such that they can communicate with each other via a dedicated communication path 30. For example, the one with the USB (universal serial bus) standard may be also used as the communication path 30; however, any standard may be used regardless of whether it is wired or wireless.

Furthermore, the main body 10 is capable of performing operation that corresponds to operation received by the operating unit 20. Moreover, the main body 10 is capable of communicating with an external device such as a client PC (personal computer) and performing operation that corresponds to a command received from an external device.

First, a hardware configuration of the main body 10 is explained. As illustrated in FIG. 24, the main body 10 includes a CPU 11, a ROM 12, a RAM 13, an HDD (hard disk drive) 14, a communication I/F (interface) 15, a connection I/F 16, and an engine unit 17, and they are connected to one another via a system bus 18.

The CPU 11 integrally controls operation of the main body 10. The CPU 11 executes programs stored in the ROM 12, the HDD 14, or the like, by using the RAM 13 as a work area (task area) to control the overall operation of the main body 10, thereby implementing various functions such as copier function, scanner function, fax function, or printer function, described above.

The communication I/F 15 is an interface for connecting to the network 7. The connection I/F 16 is an interface for communicating with the operating unit 20 via the communication path 30.

The engine unit 17 is a hardware that performs general-purpose information processing and processing other than communications to implement the copier function, the scanner function, the fax function, and the printer function. For example, it includes a scanner (image read unit) that scans and reads images of a document; a plotter (image forming unit) that conducts printing on sheet materials, such as paper; a fax unit that performs fax communication; or the like. Furthermore, it may include specific options, such as a finisher that sorts printed sheet materials or an ADF (automatic document feeder) that automatically feeds documents.

Next, the hardware configuration of the operating unit 20 is explained. As illustrated in FIG. 24, the operating unit 20 includes a CPU 21, a ROM 22, a RAM 23, a flash memory 24, a communication I/F 25, a connection I/F 26, and an operation panel 27, and they are connected to one another via a system bus 28.

The CPU 21 controls operation of the operating unit 20 in an integrated manner. The CPU 21 executes programs stored in the ROM 22, the flash memory 24, or the like, by using the RAM 23 as a work area (task area) so as to control the overall operation of the operating unit 20, thereby implementing various functions described later, such as display of information (image) that corresponds to input received from a user.

The communication I/F 25 is an interface for connecting to the network 7. The connection I/F 26 is an interface for communicating with the main body 10 via the communication path 30.

The operation panel 27 receives various types of inputs that correspond to user's operations, and it displays various types of information (e.g., the information that corresponds to a received operation, the information that indicates the operation state of the MFP 6, or the information that indicates the setting state). In this example, the operation panel 27 is configured by using a liquid crystal display (LCD) that has a touch panel function; however, this is not a limitation. For example, it may be configured by using an organic EL display device that has a touch panel function. Furthermore, in addition to or instead of it, it may be provided with an operating unit, such as hardware keys, or a display unit, such as a lamp.

Figure 25:
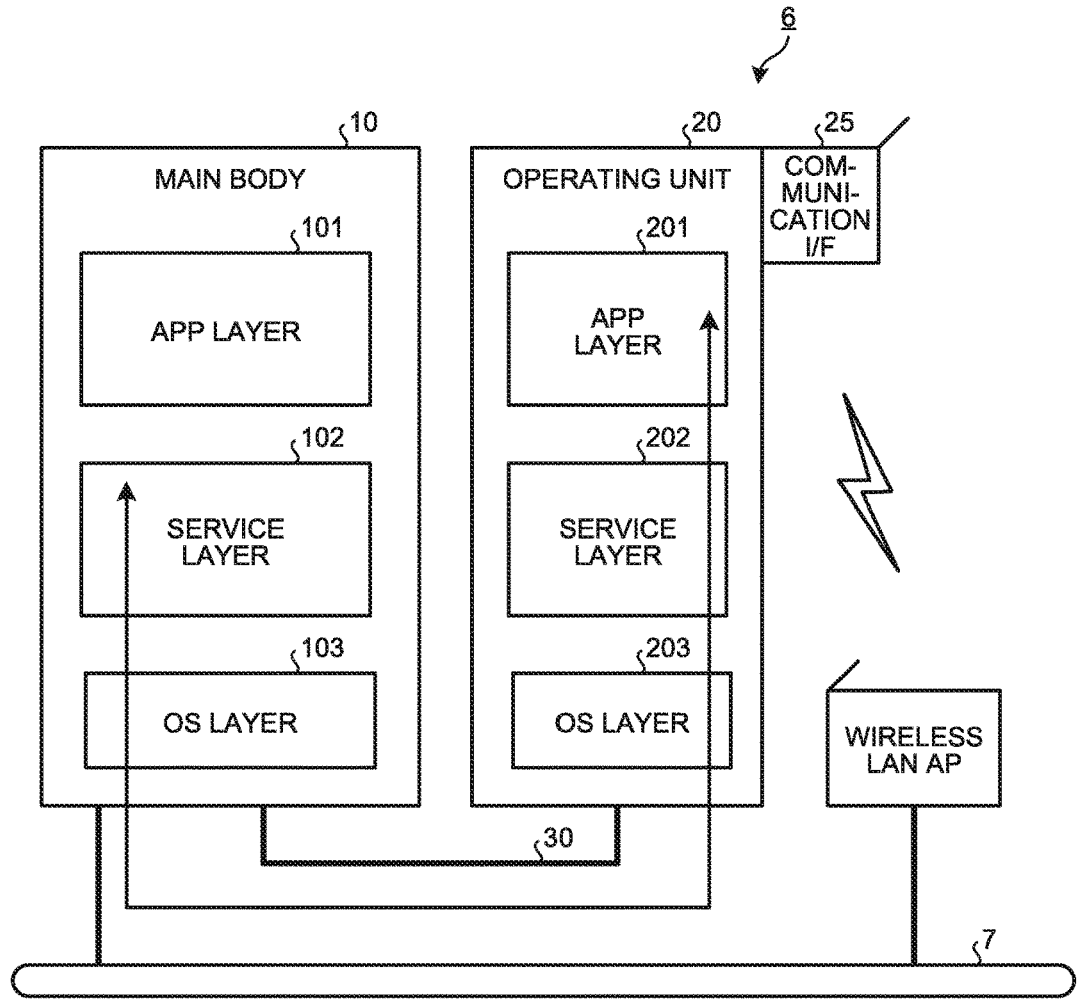
FIG. 25 is a schematic diagram that illustrates an example of the software configuration of the MFP.

Next, an explanation is given of a software configuration of the MFP 6. FIG. 25 is a schematic diagram that illustrates an example of the software configuration of the MFP 6. As illustrated in FIG. 25, the main body 10 includes an app layer 101, a service layer 102, and an OS layer 103. The app layer 101, the service layer 102, and the OS layer 103 are actually various types of software that are stored in the ROM 12, the HDD 14, or the like. The CPU 11 executes the software, thereby providing various functions.

The software of the app layer 101 is the application software (in the following explanation, sometimes simply referred to as the "app") for providing a predetermined function by operating the hardware resources. For example, the apps include a copier app for providing the copier function, a scanner app for providing the scanner function, a fax app for providing the fax function, and a printer app for providing the printer function.

The software of the service layer 102 is the software that is interposed between the app layer 101 and the OS layer 103 and that provides an app with the interface for using the hardware resources that are included in the main body 10. More specifically, it is the software for providing the functions to receive an operation request with regard to the hardware resources and to arbitrate operation requests. Possible operation requests that are received by the service layer 102 are requests for reading by the scanner, printing by the plotter, or the like.

Here, the function of the interface by the service layer 102 is provided to not only the app layer 101 of the main body 10 but also an app layer 201 of the operating unit 20. That is, the app layer 201 (app) of the operating unit 20 is also capable of implementing the function that uses the hardware resources (e.g., the engine unit 17) of the main body 10 via the interface function of the service layer 102.

The software of the OS layer 103 is the basic software (operating system (OS)) for providing the basic function to control the hardware that is included in the main body 10. The software of the service layer 102 converts the request to use the hardware resource from various apps into a command that is interpretable by the OS layer 103 and delivers it to the OS layer 103. Then, the command is executed by the software of the OS layer 103 so that the hardware resource performs operation in accordance with the request from the app.

Similarly, the operating unit 20 includes the app layer 201, a service layer 202, and an OS layer 203. The app layer 201, the service layer 202, and the OS layer 203 included in the operating unit 20 also have the same layered system as that of the main body 10. However, the function provided by an app of the app layer 201 and the type of operation request receivable by the service layer 202 are different from those of the main body 10. Although an app of the app layer 201 may be the software for providing a predetermined function by operating the hardware resource that is included in the operating unit 20, it is primarily the software for providing the function of a UI (user interface) to perform operation or display related to functions (copier function, scanner function, fax function, and printer function) included in the main body 10, the function to update license files of installed applications, and the like. In this example, the app of the app layer 201 includes an app (hereafter, sometimes referred to as "browser app") for providing the function of a Web browser, an app (hereafter, sometimes referred to as "installer") for providing a function to execute an application command included in the above-described Web content data, and the like.

Furthermore, according to the present embodiment, in order to maintain the independence of functions, the software of the OS layer 103 on the side of the main body 10 is different from the software of the OS layer 203 on the side of the operating unit 20. Specifically, the main body 10 and the operating unit 20 are operated separately from each other by using different operating systems. For example, Linux (registered trademark) may be used as the software of the OS layer 103 on the side of the main body 10, and Android (registered trademark) may be used as the software of the OS layer 203 on the side of the operating unit 20.

As described above, in the MFP 6 according to the present embodiment, the main body 10 and the operating unit 20 are operated with different operating systems; therefore, the communication between the main body 10 and the operating unit 20 is performed as not the interprocess communication within the same device but the communication between different devices. It is equivalent to operation (command communication) to transmit, to the main body 10, information (details of a command from a user) that is received by the operating unit 20, operation to notify an event to the operating unit 20 by the main body 10, and the like. Here, the operating unit 20 performs a command communication with the main body 10 so that a function of the main body 10 may be used. Furthermore, the events notified by the main body 10 to the operating unit 20 include the execution status of an operation by the main body 10, the details set at the side of the main body 10, or the like.

Furthermore, according to the present embodiment, the power is supplied to the operating unit 20 from the main body 10 via the communication path 30; therefore, the power control on the operating unit 20 may be performed separately (independently) from the power control on the main body 10.

Figure 26:
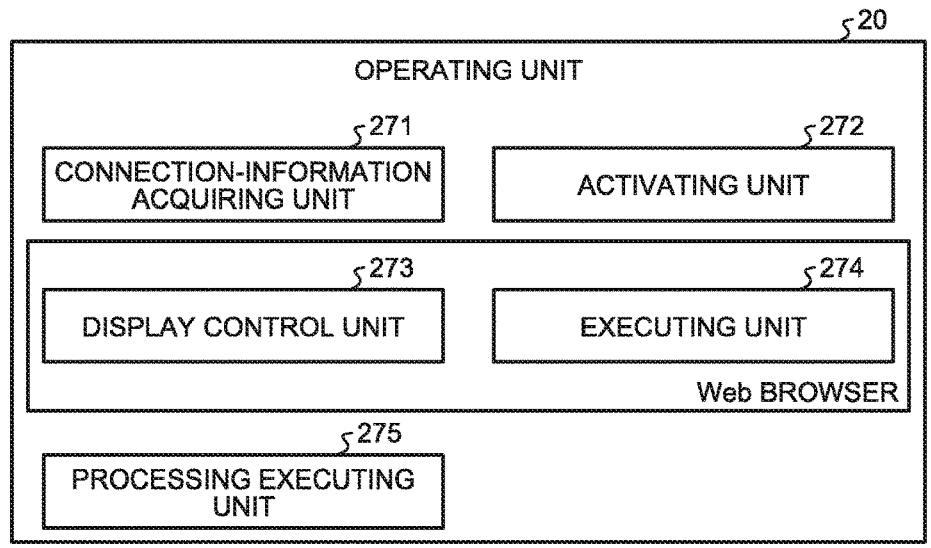
FIG. 26 is a diagram that illustrates an example of functions provided in an operating unit.

FIG. 26 is a diagram that illustrates an example of functions provided in the operating unit 20 according to the present embodiment. As illustrated in FIG. 26, the operating unit 20 includes a connection-information acquiring unit 271, an activating unit 272, the display control unit 273, an executing unit 274, and a processing executing unit 275. Here, the example of FIG. 26 principally illustrates the functions related to the present embodiment; however, functions provided in the operating unit 20 are not limited to them. Furthermore, as illustrated in FIG. 26, the display control unit 273 and the executing unit 274 are implemented by the Web browser.

To acquire the connection information (URL) on the server 2 that is connected when the activating unit 272 described later activates the browser app to provide the browser function in accordance with a user's operation, the connection-information acquiring unit 271 transmits, to the destination providing server 5, a destination acquisition request including at least the device information (device number) and the region information or the dealer-office information to request acquisition of the connection information on the server 2. Then, the connection-information acquiring unit 271 acquires the connection information (URL) on the server 2 providing an application, transmitted from the destination providing server 5, and the connection information (URL) on the destination providing server 5, stores them in a storage unit (the flash memory 24), and transfers them to the activating unit 272 described later. Here, by default, the connection-information acquiring unit 271 previously stores the connection information on at least the single destination providing server 5 that is the first to be connected. Then, for the second and subsequent times, the connection information on the destination providing server 5 is updated in accordance with an install status of other destination providing servers. Furthermore, the connection-information acquiring unit 271 may acquire the connection information (URL) on the server 2 before the activating unit 272 activates the browser app, or when (while) the activating unit 272 activates the browser app.

According to the present embodiment, examples of the request to acquire the connection information on the server 2, transmitted from the connection-information acquiring unit 271 to the destination providing server 5, include three patterns described below; however, it is optional, and there is no limitation on it.

(Acquisition of the Connection Information on the Entire Site)

A first pattern is an example of acquisition of the connection information (URL) on the entire app download site (the server 2) including modules when the server 2 includes the app-information management module 210, the license management module 220, and the app-download management module 230 illustrated in FIG. 3. FIG. 27 is a diagram that illustrates an example of the request to acquire the connection information on the server, and FIG. 28 is a diagram that illustrates an example of the connection information (URL) on the server that is received as a response to the request to acquire the connection information on the server. In the request to acquire the connection information illustrated in FIG. 27, the parameter "service" indicates the identifier of the server that requests the connection information, "device_id" indicates a device number, "region_code" indicates a region code (region information), and "dealer_code" indicates a dealer office code (dealer-office information). Here, listing "parameter name=value" with "&" after "?" is a standard notation called QUERY parameter. Furthermore, "Host:www.example.com" indicates an example of the host name connected by default, stored in the storage unit (the flash memory 24, or the like). The connection-information acquiring unit 271 stores the connection information on the server 2 illustrated in FIG. 28 in the storage unit (the flash memory 24, or the like).

(Acquisition of the Connection Information on a Site for Each Submodule)

A second pattern is an example of acquisition of the connection information (URL) for each submodule included in each module, the app-information management module 210, the license management module 220, or the app-download management module 230, illustrated in FIG. 4, FIG. 12, or FIG. 17. FIG. 29 is a diagram that illustrates an example of the request to acquire the connection information on each module, and FIG. 30 is a diagram that illustrates an example of the connection information (URL) on each module that is received as a response to the request to acquire the connection information on each module. The value of the parameter "service" in the request to acquire the connection information illustrated in FIG. 29 is an encode of a special character. Specifically, "appsdownload/api appsdownload/top appsdownload/operation appsdownload/storage" is a character string in which the identifiers of servers are arranged with space breaking, and its encoding result is "appsdownload%2Fapi+appsdownload%2Ftop+appsdownload%2Foperation+appsdownload%2Fstorage" illustrated in FIG. 29. Furthermore, "Host:www.example.com" represents an example of the host name that is connected by default, stored in the storage unit (the flash memory 24, or the like). "appsdownload/api" illustrated in FIG. 30 is an example of the connection information on the control unit 212 in the app-information management module 210 illustrated in FIG. 4, "appsdownload/top" is an example of the connection information on the screen providing unit 213 in the app-information management module 210 illustrated in FIG. 4, "appsdownload/operation" is an example of the connection information on the setting unit 214 in the app-information management module 210 illustrated in FIG. 4, and "appsdownload/storage" is an example of the connection information on the download unit 232 in the app-download management module 230 illustrated in FIG. 17. The connection-information acquiring unit 271 stores the connection information on each module illustrated in FIG. 30 in the storage unit (the flash memory 24, or the like).

(Acquisition of the Connection Information on a Site and the Connection Information on Multiple Destination Providing Servers)

A third pattern is an example of acquisition of the connection information (URL) on the entire app download site (the server 2) including each module and pieces of connection information on multiple destination providing servers when the server 2 includes the app-information management module 210, the license management module 220, and the app-download management module 230 illustrated in FIG. 3. FIG. 31 is a diagram that illustrates an example of the request to acquire the connection information on the server and the connection information on a destination providing server, and FIG. 32 is a diagram that illustrates an example of the connection information (URL) on the server and the pieces of connection information (URL) on multiple destination providing servers, received as a response to the request to acquire the connection information on a server and the connection information on a destination providing server. The value of the parameter "service" in the request to acquire the connection information illustrated in FIG. 31 is the same as that described above in FIG. 29, and it is an encode of a special character. Furthermore, "Host:www.example.com" represents an example of the host name that is connected by default, stored in the storage unit (the flash memory 24, or the like). "discovery" illustrated in FIG. 32 represents a destination providing server, the first "https://jp.example.com/discov" is an example of the connection information on a destination providing server in the region information "JP", and the second "https://us.example.com/discov" is an example of the connection information on a destination providing server in the region information "US". In the response example of FIG. 32, the region information on the device (the MFP 6) that has made a request to acquire connection information is "JP" and, based on the region information "JP", the connection information on the destination providing server that is geographically close in "JP" comes first. Furthermore, as described above, the order in which pieces of connection information are arranged may be determined based on dealer-office information or may be determined based on a device number (device information). The connection-information acquiring unit 271 stores the connection information on the server 2 and the pieces of connection information on the destination providing servers illustrated in FIG. 32 in the storage unit (the flash memory 24, or the like).

Explanation is continued with reference back to FIG. 26. The activating unit 272 activates the browser app for providing a Web browser function in accordance with user's operation. Here, when activating the browser app, the activating unit 272 checks whether the dealer-office information on its own device (the MFP 6) is stored and, when the dealer-office information (dealer office code information) is not stored, the display control unit 273 causes the operation panel 27 to display the UI screen for inputting the dealer-office information. However, there is a case where no dealer-office information is set like the organization ID "O0002" illustrated in FIG. 7; therefore, it is possible that the setting of a dealer-office information set flag is separately stored and only when the dealer-office information set flag has not been set, the UI screen is displayed. Furthermore, before the device (the MFP 6) is shipped, the initial value of the region information is previously stored in a storage unit as the destination setting. The UI screen for inputting the dealer-office information is displayed only for the first time, and after the dealer-office information is input and stored, the UI screen is not displayed the next time.

Although the connection-information acquiring unit 271 is explained first in the above description, the setting of the dealer-office information (dealer office code) by the activating unit 272 comes first in the execution sequence during the processing flow, and then acquisition of the connection information (URL) on the server 2 is executed by the connection-information acquiring unit 271. This is because the connection-information acquiring unit 271 acquires connection information in accordance with the setting of the dealer-office information that is previously set by the activating unit 272.

Figure 33:
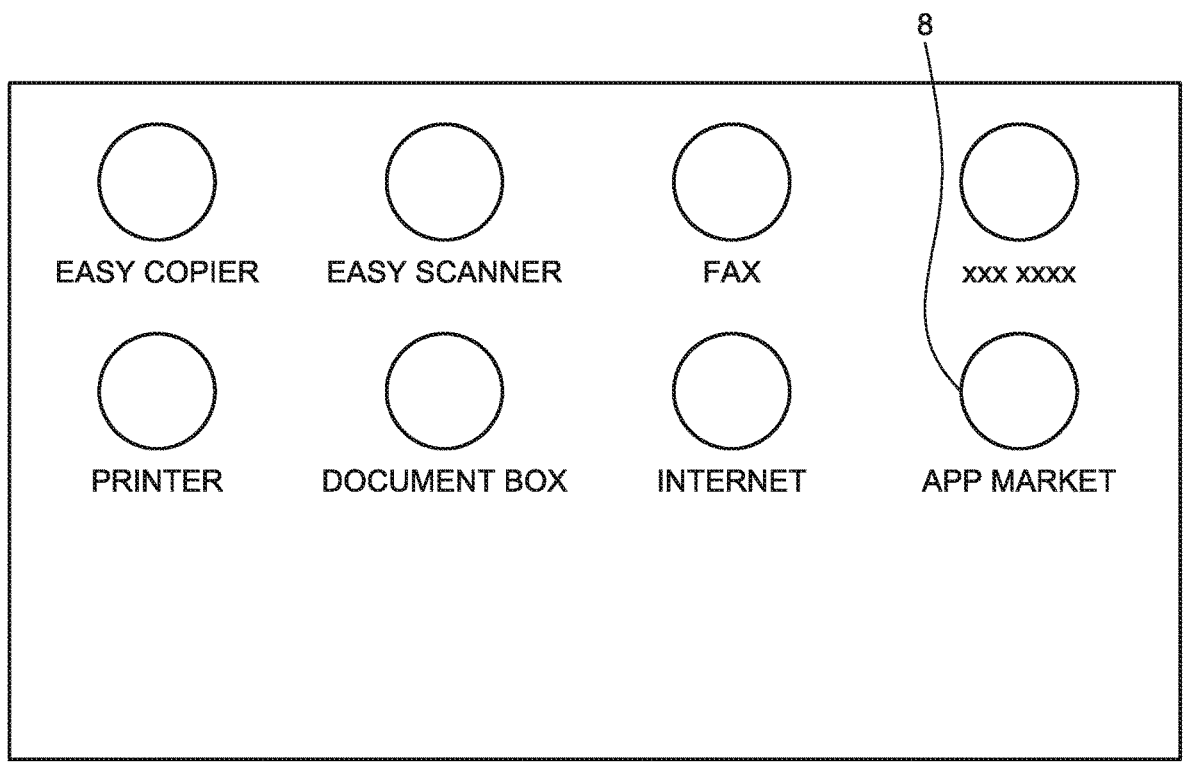
FIG. 33 is a diagram that illustrates an example of the operation screen.
Figure 34:
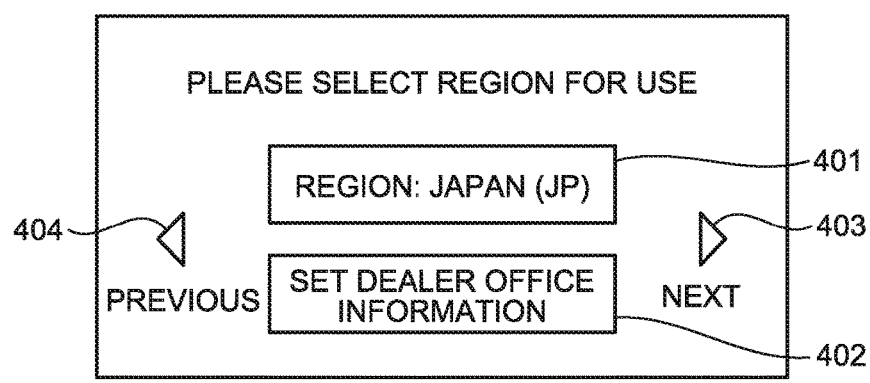
FIG. 34 is a diagram that illustrates an example of a region-information setting screen.
Figure 35:
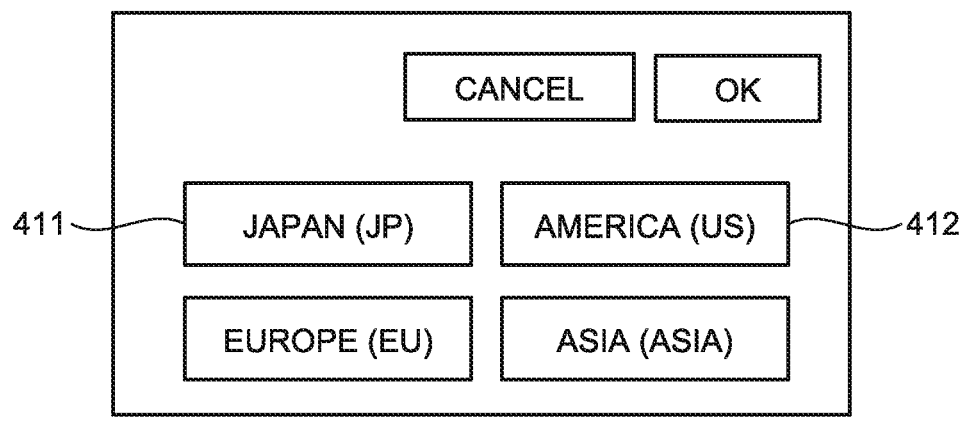
FIG. 35 is a diagram that illustrates an example of a region-information setting dialogue screen.

For example, when a press is received on an icon 8 with the name "app market" while the operation screen illustrated in FIG. 33 is displayed on the operation panel 27 (display unit) and when it is checked that the activating unit 272 does not store the dealer-office information on its own device (the MFP 6), the display control unit 273 causes the operation panel 27 (display unit) to display a region-information setting screen illustrated in FIG. 34. FIG. 34 is a diagram that illustrates an example of the region-information setting screen. In the example of FIG. 34, the region-information setting screen displays at least a region-information selection button 401 for selecting region information; a dealer-office information setting button 402 for setting dealer-office information; a next button 403 for transitioning to the next screen; and a previous button 404 for returning to the operation screen illustrated in FIG. 33. "region: Japan (JP)" displayed on the region-information selection button 401 is previously stored region information in the destination setting before shipment. When the region-information selection button 401 is selected to change the region information, a region-information setting dialogue screen illustrated in FIG. 35 is displayed. FIG. 35 is a diagram that illustrates an example of the region-information setting dialogue screen. In the example of FIG. 35, the region-information setting dialogue screen displays pieces of region information representing regions such as "Japan (JP) 411", "America (US) 412", "Europe (EU)", or "Asia (ASIA)". In FIG. 35, when "America (US) 412" is selected and the "OK" button is pressed, the region-information setting screen illustrated in FIG. 34 is returned so that a change has been made to "region: America (US)".

Figure 36:
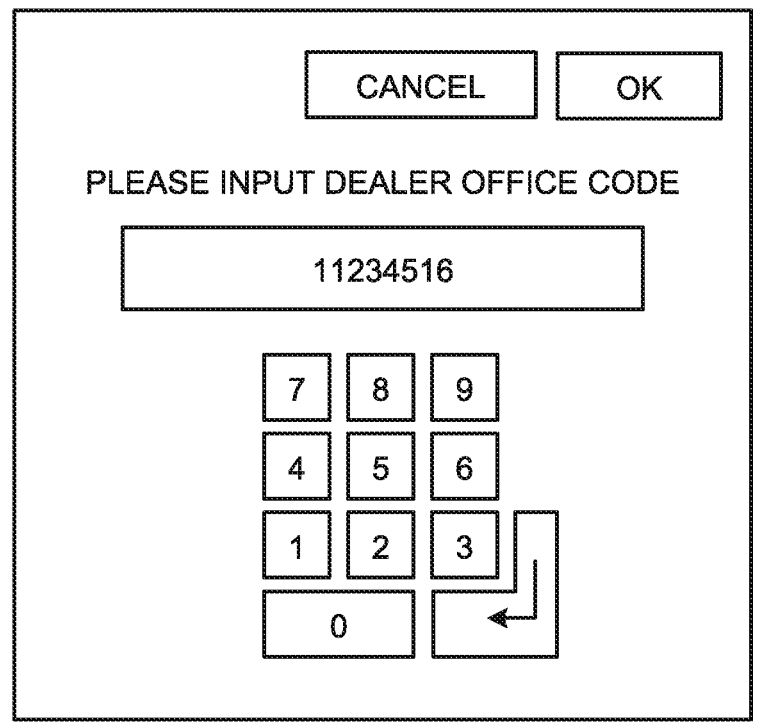
FIG. 36 is a diagram that illustrates an example of a dealer-office information input screen.
Figure 37:
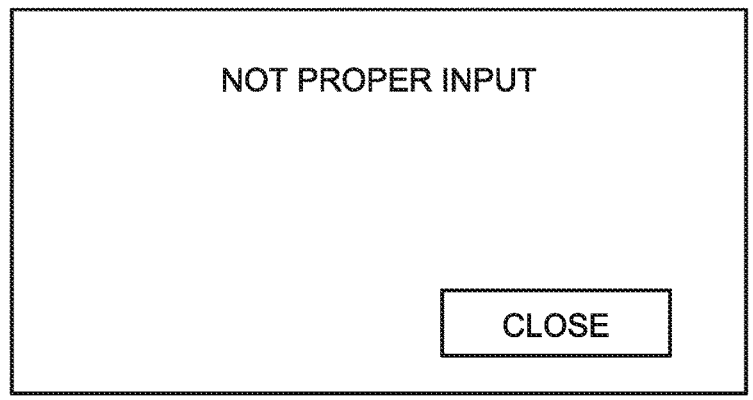
FIG. 37 is a diagram that illustrates an example of an error screen.

Then, after the dealer-office information setting button 402 illustrated in FIG. 34 is selected, the dealer-office information input screen illustrated in FIG. 36 is displayed. FIG. 36 is a diagram that illustrates an example of the dealer-office information input screen. The example of FIG. 36 displays at least a numeric keypad button for inputting a dealer office code (code information indicating dealer-office information). The dealer office code "11234516" illustrated in the example of FIG. 36 is optionally settable; for example, the first character "1" represents "region", and it is assigned such that "1: Japan (JP)", "2: America (US)", "3: Europe (EU)", and "4: Asia (ASIA)". The next five characters "12345" represent "dealer-office information", and for example any random number identifying a dealer is previously assigned. The reason why any random number is assigned is to reduce the possibility that a different dealer office code is improperly input. The last two characters "16" represent "check sum", and for example it is to detect improper input of a dealer office code. Furthermore, for dealer office codes, a system for encrypting the entire code, or the like, may be used. In FIG. 36, after a dealer office code is input and the "OK" button is pressed, error detection is performed (in this example, it is determined whether the region information (the first character) identified from the code information received through the dealer-office information input screen is identical to the value of the region information that is set through the region-information setting dialogue screen in FIG. 35, and when they are not identical (when the values are different), it is determined that there is an error. Alternatively, a check sum is calculated for the first six characters (the region information+the dealer-office information) in the code information received through the dealer-office information input screen, it is compared with the last two characters so that it is determined whether they are identical values, and when they are not identical (when the values are different), it is determined that there is an error. Due to this check sum, it is determined whether predetermined information included in the code information is identical to preset information), and when there is an error, the error screen illustrated in FIG. 37 is displayed. FIG. 37 is a diagram that illustrates an example of the error screen. In FIG. 37, after the "close" button is pressed, the screen for inputting a dealer office code (code information indicating dealer-office information) is displayed again (see FIG. 36). When a dealer office code is properly input in FIG. 36, the region-information setting screen illustrated in FIG. 34 is displayed. Furthermore, the activating unit 272 stores the region information and the dealer-office information (dealer office code) input as described above in the storage unit (the flash memory 24, or the like).

Figure 38:
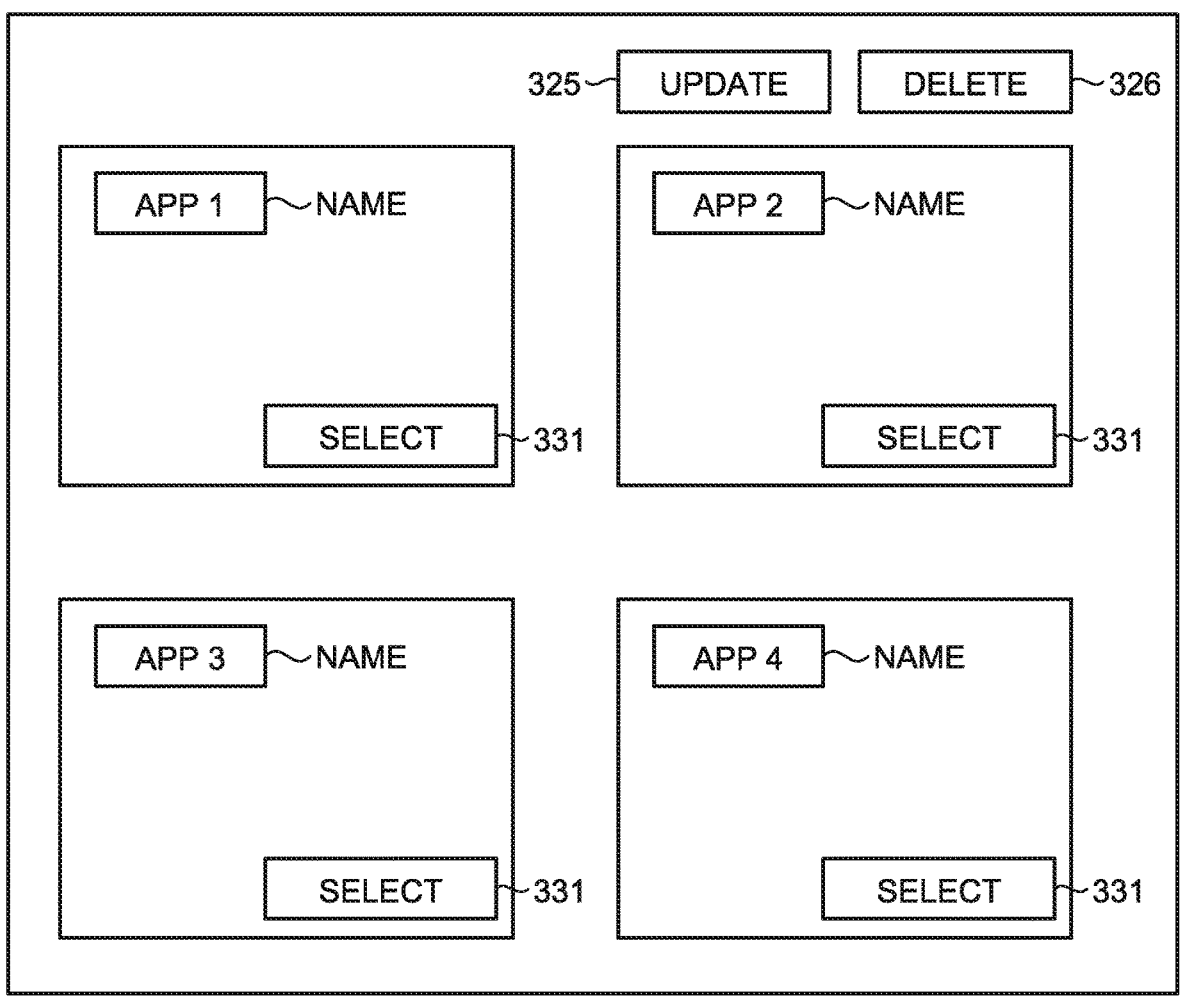
FIG. 38 is a diagram that illustrates an example of an application list screen.

Then, after the next button 403 for transitioning to the next screen, illustrated in FIG. 34, is pressed, an application list screen illustrated in FIG. 38 is displayed. FIG. 38 is a diagram that illustrates an example of the application list screen. Furthermore, the application list screen is explained later in detail.

Explanation is continued with reference back to FIG. 33. When a press is received on the icon 8 with the name "app market" while the operation screen illustrated in FIG. 33 for example is displayed on the operation panel 27, the activating unit 272 notifies the connection-information acquiring unit 271 of a press on the icon 8, and the connection-information acquiring unit 271 refers to the connection information (URL) on the destination providing server 5, stored in the storage unit (the flash memory 24, or the like), transmits a request to acquire the connection information on the server 2, acquires the URL indicating the location of the server 2 in the network 7, and transfers the URL indicating the location of the server 2 to the activating unit 272. Then, the activating unit 272 performs control to activate the browser app. Furthermore, the connection-information acquiring unit 271 saves or updates the acquired connection information (URL) on the server 2.

The activated browser app (screen-information acquiring unit) transmits the above-described screen information request as an HTTP request to the server 2 specified by the URL received from the activating unit 272 and receives Web content data (screen information) as a response (HTTP response) to the screen information request. In this example, HTML and CSS/JavaScript included in HTML (or referred to by HTML) are received as Web content data (screen information). The browser app (display-information acquiring unit) interprets and executes JavaScript, transmits the above-described display information request as an HTTP request to the server 2 by using Ajax, and receives Web content data (display information) including at least an application command as a response (HTTP response) to the display information request. Furthermore, the functions of "the display-information acquiring unit" and "the screen-information acquiring unit" in claims are provided by the browser app. FIG. 39 is a diagram that illustrates an example of the display information request, and FIG. 40 is a diagram that illustrates an example of information received as a response to the display information request.

Then, the browser app performs control to display the screen configured based on Web content data (screen information and display information) received from the server 2 on the operation panel 27 (display unit). Here, the function of the display control unit 273 is provided by the browser app. Furthermore, as described above, in this example, the display control unit 273 generates the screen on the basis of Web content data (screen information and display information) received from the server 2 and displays the generated screen on the operation panel 27. The display control unit 273 is capable of storing Web content data (screen information and display information) received from the server 2 in a storage device such as the flash memory 24, reading Web content data (screen information and display information) as needed, and generating a screen by using the read Web content data (screen information and display information).

In this example, the display control unit 273 is capable of identifying an application command selected in accordance with user's operation on the screen (the screen configured based on Web content data (screen information and display information)) displayed on the operation panel 27 and notifying the identified application command to the executing unit 274. For example, the display control unit 273 is capable of identifying an application command selected by a user as JavaScript (registered trademark), custom scheme.

The executing unit 274 executes an application command (application command notified by the display control unit 273) included in Web content data in accordance with user's operation via the screen displayed on the operation panel 27 among application commands included in the Web content data, and it requests the MFP 6 to execute processing in connection with the application related to the application command. Here, the function of the executing unit 274 is provided by the application programming interface (API) at the side of the MFP 6. The MFP 6 is capable of invoking the application programming interface (API) from a Web application that is available to the browser app of the operating unit 20 and that is provided in the server 2.

In accordance with a request from the Web browser (the executing unit 274), the processing executing unit 275 executes processing in connection with the application related to the request.

As described above, application commands included in Web content data received from the server 2 include install command, update command, uninstall commands, and the like.

An explanation is given below of a case where, for example, an install command is selected in accordance with user's operation on the screen configured based on Web content data (screen information and display information) received from the server 2. In this case, the executing unit 274 notifies the processing executing unit 275 of the install command selected in accordance with user's operation, and the processing executing unit 275 executes the install command notified by the executing unit 274. More specifics are described below.

In this example, the display control unit 273 performs control to display, on the operation panel 27, the application list screen (see FIG. 38) indicating the list of applications available to the device (the MFP 6) by using Web content data (screen information and display information) received from the server 2. In the example of FIG. 38, for each application available to the device (the MFP 6), the application list screen displays at least the name of the application and an application selection button 331 for selecting the application. Furthermore, in the example of FIG. 38, the application list screen displays an update selection button 325 for selecting application update and a deletion selection button 326 for selecting application deletion. The details are described later.

Figure 41:
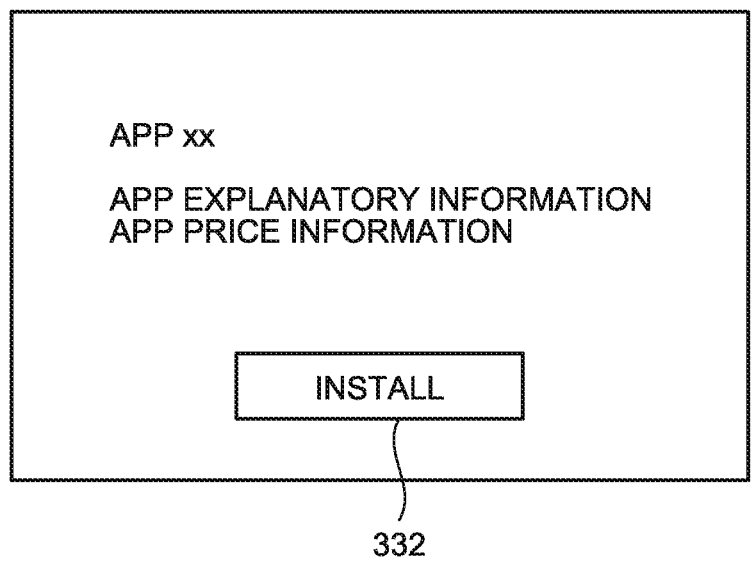
FIG. 41 is a diagram that illustrates an example of an install command screen.

When a press is received on any of the application selection buttons 331, the display control unit 273 uses screen information received from the server 2 to perform control so as to indicate details of a corresponding application and display, on the operation panel 27, the install command screen for receiving an install execution command. FIG. 41 is a diagram that illustrates an example of the install command screen. In the example of FIG. 41, the install command screen displays app explanatory information and app price information on a corresponding application and an install button 332 for giving a command for install execution. In this example, a press on the install button 332 means selection of an install command (it may be considered as selection of an application to be installed).

Figure 42:
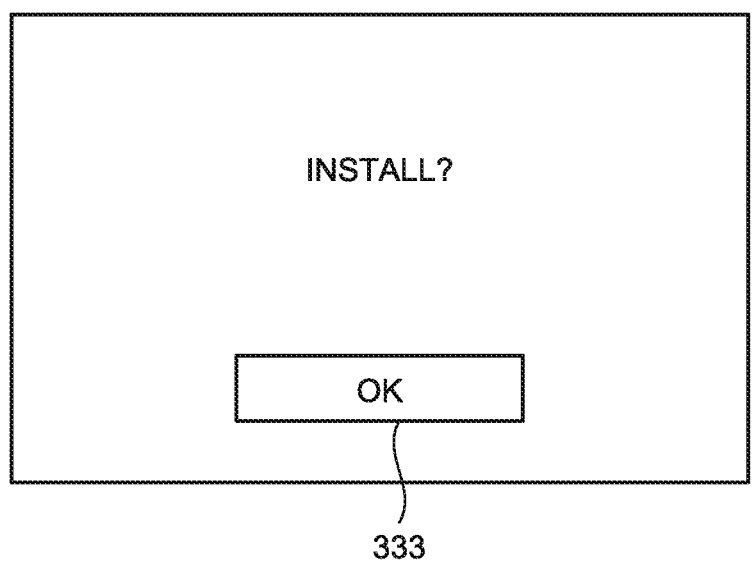
FIG. 42 is a diagram that illustrates an example of an install confirmation screen.

In this example, when a press is received on the install button 332, the display control unit 273 performs control to display, on the operation panel 27, the install confirmation screen for finally confirming install execution. FIG. 42 is a diagram that illustrates an example of the install confirmation screen. In the example of FIG. 42, the install confirmation screen displays a confirmation button (OK) 333 for confirming that install execution is finally accepted. In this example, an install command is attached to the confirmation button 333 in a JavaScript format. When a press is received on the confirmation button 333, the executing unit 274 notifies the processing executing unit 275 of the install command that is attached to the pressed confirmation button 333. Then, the processing executing unit 275 executes the install command. FIG. 43 is a diagram that illustrates an example of information (JavaScript attached to the confirmation button 333) that is notified from the executing unit 274 to the processing executing unit 275 in this case.

Figure 44:
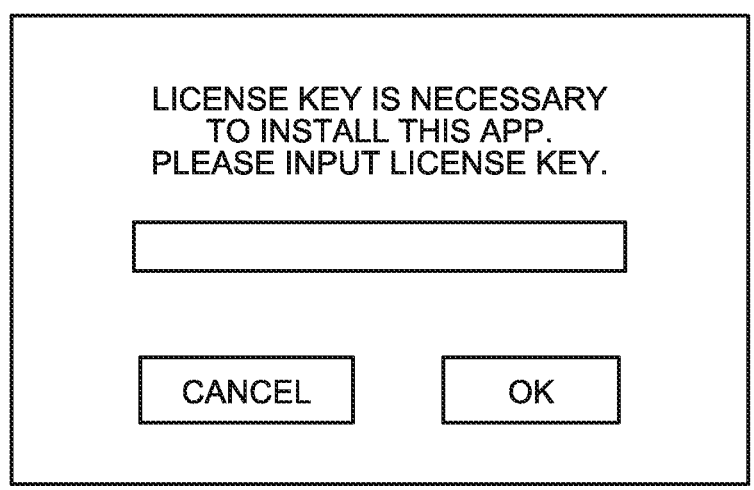
FIG. 44 is a diagram that illustrates an example of an input screen.

Furthermore, according to the present embodiment, when the display information received from the server 2 includes the license key used for authentication of the right of use for the application targeted for the install command selected in accordance with user's operation, the executing unit 274 notifies the processing executing unit 275 of the license key and the install command and, when the license key is not included, performs control to display the input screen for prompting input of the license key. More specifically, when the license key for authentication of the right of use of the application is not included in the detail information that is related to the application targeted for the install command selected in accordance with user's operation in application detail information in the display information received from the server 2, the display control unit 273 performs control so as to display the input screen for prompting input of the license key and, when the license key is included, notifies the processing executing unit 275 of the license key and the install command. More specifically, when a press is received on the above-described install button 332, the display control unit 273 checks whether a license key is included in the detail information that is related to the application selected by a user in application detail information in the display information received from the server 2. When no license key is included, the display control unit 273 does not display the install confirmation screen in FIG. 42 but performs control to display the input screen for prompting input of the license key, and the executing unit 274 notifies the processing executing unit 275 of the input license key and the selected install command. FIG. 44 is a diagram that illustrates an example of the input screen. In the same manner as FIG. 43, an install command is attached to the OK button in FIG. 44. In this case, the character string input to the license-key input area is delivered as the second argument for the appMgmt.install function.

Next, an explanation is given of a case where, for example, an update command is selected on the screen configured based on Web content data (screen information and display information) received from the server 2 in accordance with user's operation. In this example, among installed applications, the display control unit 273 identifies an application whose current version is different from the version indicated by the detail information that corresponds to the application in application detail information included in the display information received from the server 2 in accordance with user's operation. Then, when the update command that is related to the identified application is selected in accordance with user's operation, the executing unit 274 notifies the selected update command to the processing executing unit 275. The processing executing unit 275 executes the update command notified by the executing unit 274. More specifics are described below.

When a press is received on the update selection button 325 displayed on the application list screen illustrated in FIG. 38, the display control unit 273 acquires display information received from the server 2 and application management information that relates each application installed in the device (the MFP 6) with the current version of the application. In this example, as the processing executing unit 275 manages the above-described application management information, the executing unit 274 requests application management information from the processing executing unit 275, and the display control unit 273 acquires application management information. Then, as the target application to be updated among the installed applications, the display control unit 273 identifies an application whose current version, which is related to the application in the application management information, is different from the version indicated by the detail information that is related to the application in application detail information included in the display information received from the server 2. For example, in the case assumed, the application management information has the form in FIG. 45, and the application detail information included in the display information received from the server 2 has the form in FIG. 46. In this case, the app ID "S001" and the app ID "S003" are identified as the target applications to be updated.

Figure 47:
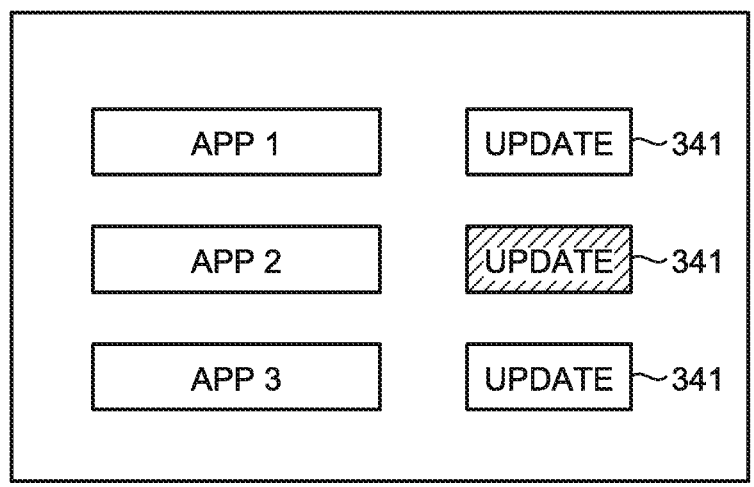
FIG. 47 is a diagram that illustrates an example of an update command screen.

Then, the display control unit 273 performs control to display, on the operation panel 27, the update command screen for receiving an update command for a corresponding application with regard to each of the above-described identified applications. FIG. 47 is a diagram that illustrates an example of the update command screen. The update command screen displays an update command button 341 for receiving an update command for a corresponding application with regard to each of the applications. In this example, an update command indicating a command to update a corresponding application is attached to the update command button 341 that corresponds to the target application to be updated (the application identified as described above). In the example of FIG. 47, the update command screen displays both the target applications to be updated (apps 1, 3 in the example of FIG. 47) and applications that are not to be updated (an app 2 in the example of FIG. 47), and the update command button 341 that corresponds to the application that is not to be updated is in an inoperable state (a state where no press is receivable). That is, the update command screen distinctively displays the target application to be updated (the application identified as described above) and the application that is not to be updated; however, this is not a limitation, and a configuration may be such that, for example, the update command screen displays only the target application to be updated by being related to the update command button 341 in an operable state. Furthermore, for example, the display control unit 273 may perform control to display the information indicating the number of applications identified as described above (target applications to be updated). Specifically, among the applications installed in the device (the MFP 6), the display control unit 273 may perform control to display the information indicating the number of applications whose current version is different from the version indicated by the detail information that corresponds to the application in application detail information. When a press is received on the update command button 341, the executing unit 274 notifies the processing executing unit 275 of the update command that is attached to the update command button 341. FIG. 48 is a diagram that illustrates an example of the information notified from the executing unit 274 to the processing executing unit 275 in this case.

Furthermore, in this example, the above-described update command button 341 is individually provided for each target application to be updated; however, this is not a limitation, and for example a configuration may be such that a button is provided to give a command so as to collectively update the target applications to be updated. In this case, when a press is received on the button, update commands for all the target application to be updated are collectively selected. That is, application commands may include a collective update command indicating a command to collectively update applications whose current version is different from the version indicated by the detail information that corresponds to the application in the application detail information among the applications installed in the device (the MFP 6). In this case, a configuration may be such that, when a collective update command is selected (when a press is received on the button for giving a command to collectively update the target applications to be updated), the display control unit 273 identifies the application whose current version is different from the version indicated by the detail information that is related to the application in the application detail information among the applications installed in the device (the MFP 6) and the executing unit 274 notifies the processing executing unit 275 of the update command that is related to the identified application.

Furthermore, a configuration may be such that, for example, the server 2 has the function to identify the target application to be updated. In this case, for example, before the above-described display information request is transmitted, the display control unit 273 may acquire the above-described application management information from the processing executing unit 275 and also transmit the display information request with the acquired application management information added thereto to the server 2. With regard to each app ID included in the application management information received from the MFP 6, the server 2 may compare the version related to a corresponding app ID in the application management information with the version related to the app ID in the app information DB 261 (the second relation information) managed by the server 2 to identify the app ID with a difference as the target app ID to be updated. Furthermore, a configuration may be such that the server 2 transmits the information indicating the app ID identified as the target to be updated to the MFP 6 by being included in display information. Furthermore, a configuration may be such that, for example, applications installed in the MFP 6 are managed (the above-described application management information is managed) at the side of the server 2. In this case, for example, the server 2 may update application management information when a license becomes valid or invalid or may also update application management information when an application is updated. In this case, as there is no need to acquire from the MFP 6 the current version of an application installed in the MFP 6, the target application to be updated may be determined by only the server 2 and the load of processing on the MFP 6 may be reduced.

Next, an explanation is given of a case where, for example, an uninstall command is selected on the screen configured based on Web content data (screen information and display information) received from the server 2 in accordance with user's operation. In this example, the executing unit 274 notifies the processing executing unit 275 of an uninstall command selected in accordance with user's operation, and the processing executing unit 275 executes the uninstall command notified by the executing unit 274. More specifics are described below.

Figure 49:
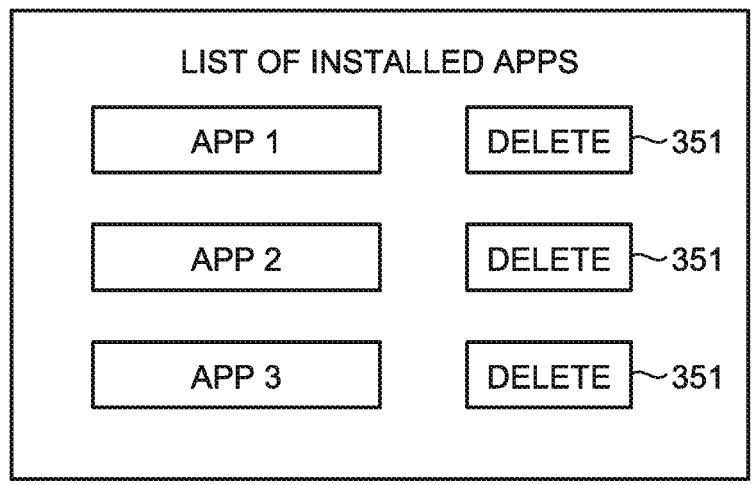
FIG. 49 is a diagram that illustrates an example of a deletion command screen.
Figure 50:
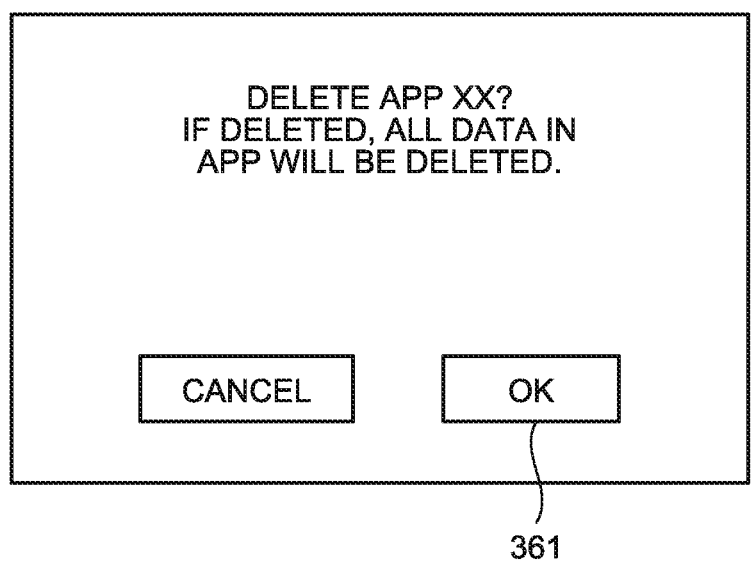
FIG. 50 is a diagram that illustrates an example of a deletion confirmation screen.

When a press is received on the deletion selection button 326 displayed on the application list screen illustrated in FIG. 38, the display control unit 273 performs control to display, on the operation panel 27, the deletion command screen for receiving a command to delete a corresponding application with regard to each application installed in the MFP 6. FIG. 49 is a diagram that illustrates an example of the deletion command screen. For each application installed in the MFP 6, the deletion command screen displays a deletion command button 351 for receiving a command to delete the application. When a press is received on the deletion command button 351, the display control unit 273 performs control to display, on the operation panel 27, the deletion confirmation screen for finally confirming uninstall execution. FIG. 50 is a diagram that illustrates an example of the deletion confirmation screen. The deletion confirmation screen displays a confirmation button (OK) 361 for confirming that uninstall execution is finally accepted. In this example, the confirmation button 361 is attached to deletion commands indicating commands to delete one or more applications that is related to the confirmation button 361. When a press is received on the confirmation button 361, the executing unit 274 notifies the processing executing unit 275 of an uninstall command attached to the pressed confirmation button 361. FIG. 51 is a diagram that illustrates an example of the information notified from the executing unit 274 to the processing executing unit 275 in this case.

In this example, the above-described deletion command button 351 is individually provided for each application installed in the MFP 6; however, this is not a limitation, and, for example, a configuration may be such that a button is provided to give a command so as to collectively delete applications installed in the MFP 6. With this configuration, when a press is received on the button, uninstall commands for all the applications installed in the MFP 6 are collectively selected. That is, a configuration may be such that application commands include a collective uninstall command indicating a command to collectively delete applications installed in the MFP 6 and, when a collective uninstall command is selected, the executing unit 274 notifies the processing executing unit 275 of an uninstall command that is related to applications installed in the MFP 6 (one or more uninstall commands that are related to one or more installed applications on a one-to-one basis).

Each function of the connection-information acquiring unit 271, the activating unit 272, the display control unit 273, the executing unit 274, and the processing executing unit 275, described above, may be implemented when the CPU 21 executes programs stored in a storage device such as the ROM 22 or the flash memory 24.

Figure 52:
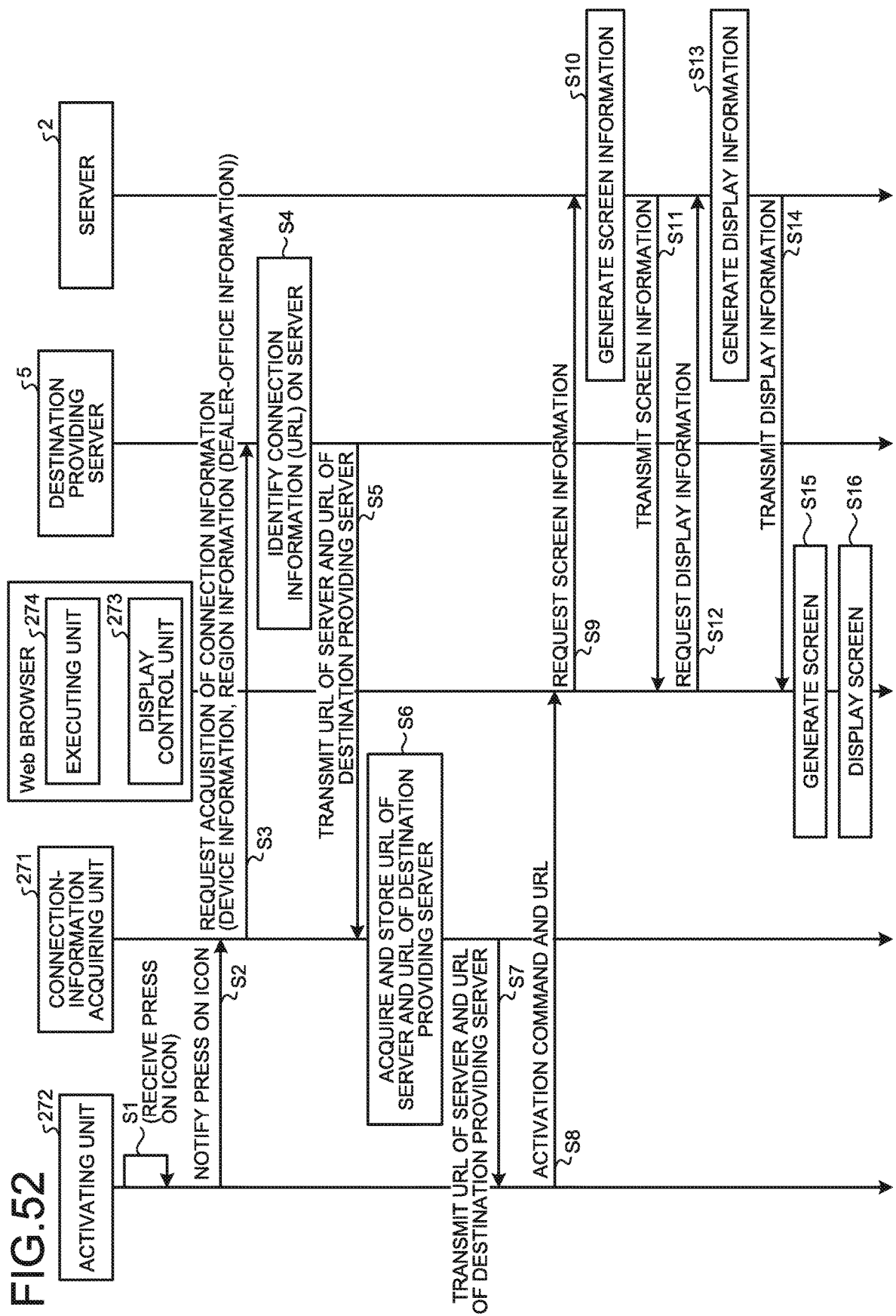
FIG. 52 is a sequence diagram that illustrates an example of the steps of operation of the system.

FIG. 52 is a sequence diagram that illustrates an example of the steps of operation of the system 1 according to the present embodiment. First, the destination providing server 5 stores the information in which the region information indicating the geographical position where the device (the MFP 6) is installed or the dealer-office information indicating the dealer of the device (the MFP 6) is related to the connection information on the server 2 providing an application. Furthermore, the activating unit 272 of the MFP 6 stores region information or dealer-office information. Moreover, the connection-information acquiring unit 271 of the MFP 6 previously stores the connection information on the single destination providing server 5 before shipment.

As described above, when a press is received on the icon 8 with the name "app market" on the operation screen (Step S1), the activating unit 272 of the MFP 6 notifies the connection-information acquiring unit 271 that the icon 8 has been pressed (Step S2). The connection-information acquiring unit 271 transmits, to the destination providing server 5, the connection-information acquisition request including at least device information (device number) and region information or dealer-office information to request acquisition of the connection information on the server 2 (Step S3). The connection-information identifying unit 322 of the destination providing server 5 receives, from the device (the MFP 6), the connection-information acquisition request including at least the region information or the dealer-office information and the device information (device number) to request acquisition of the connection information on the server 2, refers to the connection relation information stored in the storage unit 311 (the connection information DB 321 in this example), and identifies the connection information (URL) on the server 2 providing an application published by the organization identified with the organization ID that is related to the region information or the dealer-office information included in the connection-information acquisition request (Step S4). The connection-information identifying unit 322 transmits the identified connection information (URL) on the server 2 and the connection information (URL) on its own (the destination providing server 5) to the connection-information acquiring unit 271 of the MFP 6 that is the transmission source of the connection-information acquisition request (Step S5).

The connection-information acquiring unit 271 receives a response to the connection-information acquisition request of the server 2 from the destination providing server 5 to acquire the connection information (URL) on the server 2 and the connection information (URL) on the destination providing server 5 and stores them in the storage unit (the flash memory 24, or the like) (Step S6) and then transmits the above-described two pieces of connection information (URL) to the activating unit 272 (Step S7). The activating unit 272 transmits an activation command and the URL of the server 2 to a browser app (the display control unit 273 and the executing unit 274) that is a Web browser (Step S8). After being activated by receiving the activation command, the browser app (the display control unit 273 and the executing unit 274) transmits the above-described screen information request as an HTTP request to the server 2 designated by the received URL (Step S9).

Then, the server 2 generates Web content data (screen information) in accordance with a request from the MFP 6 (Step S10) and transmits the generated Web content data (screen information) as an HTTP response to the MFP 6 (Step S11). The MFP 6 (the display control unit 273) receives Web content data (screen information) as a response to the screen information request that is an HTTP request. For example, as Web content data (screen information), the MFP 6 (the display control unit 273) receives HTML and CSS/JavaScript included in HTML (or referred to by HTML).

Then, after receiving the screen information, the browser app of the MFP 6 interprets and executes JavaScript and, by using Ajax, transmits the above-described display information request (see FIG. 39) as an HTTP request to the server 2 (Step S12).

The server 2 generates display information in accordance with a request from the MFP 6 (Step S13) and transmits the generated Web content data (display information) as an HTTP response to the MFP 6 (Step S14). The MFP 6 (the display control unit 273) receives Web content data (display information) as a response to the display information request that is an HTTP request.

The MFP 6 (the display control unit 273) generates the screen configured based on Web content data (screen information and display information) received from the server 2 (Step S15) and displays the generated screen on the operation panel 27 (Step S16). In this example, the display control unit 273 stores Web content data (screen information and display information) received from the server 2 in the storage device, such as the flash memory 24, and uses the received Web content data (screen information and display information) to first generate the application list screen illustrated in FIG. 38. Then, a control is performed to display the generated application list screen on the operation panel 27 (display unit).

Figure 53:
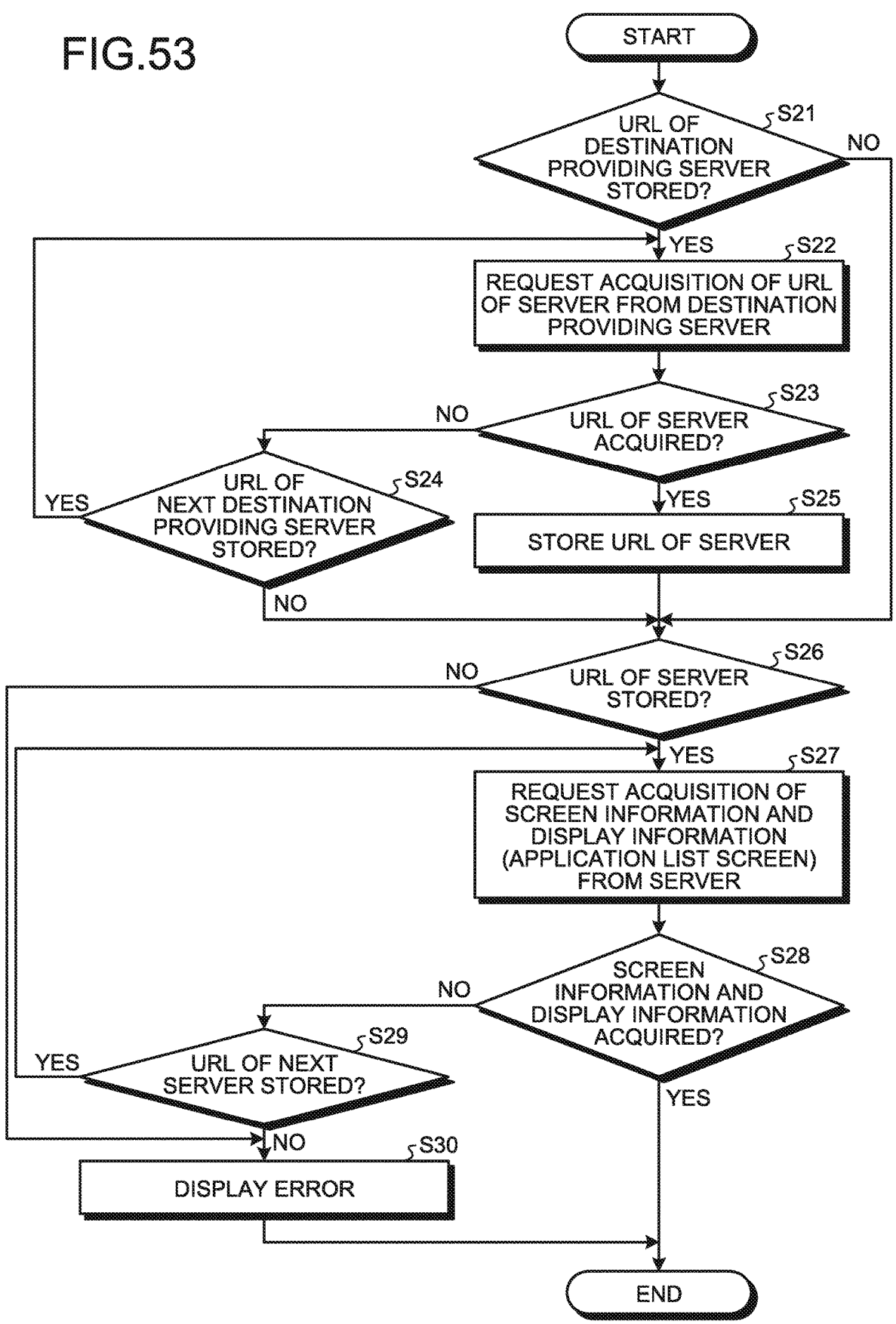
FIG. 53 is a flowchart that illustrates an operation example of the MFP.

FIG. 53 is a flowchart that illustrates an operation example of the MFP 6 after a press on the icon 8 is received by the MFP 6 until the application list screen is acquired. That is, it is an example of processing by the MFP 6 at Step S1 to Step S9, Step S11 to Step S12, and Step S14 in FIG. 52 described above.

When the notification (Step S1) of a press on the icon 8 is received, the connection-information acquiring unit 271 of the MFP 6 determines whether the connection information (URL) on the destination providing server 5 is saved (stored) in the storage unit (the flash memory 24, or the like) (Step S21). The connection-information acquiring unit 271 previously stores the URL on the single destination providing server 5 before shipment; however, when the URL of the destination providing server 5 is not saved (stored) in the storage unit (the flash memory 24, or the like) (Step S21: No), the process proceeds to Step S26.

When the URL of the destination providing server 5 is saved (stored) in the storage unit (the flash memory 24, or the like) (Step S21: Yes), the connection-information acquiring unit 271 transmits a request to acquire the URL of the server 2 to the URL of the destination providing server 5 (Step S22). Then, the connection-information acquiring unit 271 determines whether the URL of the server 2 has been acquired from the destination providing server 5 (Step S23). When the URL of the server 2 has not been acquired (Step S23: No), the connection-information acquiring unit 271 determines whether the URL of the next destination providing server 5 is saved (stored) in the storage unit (the flash memory 24, or the like) (Step S24). As described above with the connection-information identifying unit 322 and the list generating unit 323, there is a case where the URL of the single destination providing server 5 is acquired from the destination providing server 5 or a case where the list of URLs of multiple destination providing servers is acquired; therefore, the connection-information acquiring unit 271 performs a determination process at Step S24. Here, examples of the cause of a failure to acquire the URL of the server 2 include a failure to connect to the server 2 due to server down, network down, or the like.

When the URL of the next destination providing server 5 is saved (stored) in the storage unit (the flash memory 24, or the like) (Step S24: Yes), Step S22 is returned, and the process for the request to acquire the URL of the server 2 is continued. When the URL of the next destination providing server 5 is not saved (stored) in the storage unit (the flash memory 24, or the like) (Step S24: No), a transition is made to the process at Step S26.

Step S23 is returned, and when the URL of the server 2 has been acquired (Step S23: Yes), the connection-information acquiring unit 271 stores the URL of the server 2 in the storage unit (the flash memory 24, or the like) (Step S25).

Next, the activating unit 272 determines whether the URL of the server 2 is saved (stored) in the storage unit (the flash memory 24, or the like) (Step S26). When the URL of the server 2 is not saved (stored) in the storage unit (the flash memory 24, or the like) (Step S26: No), a transition is made to Step S30, an error screen is displayed on the operation panel 27 (display unit) (Step S30), and the process is terminated. That is, a case where the URL of the server 2 is not saved (stored) in the storage unit (the flash memory 24, or the like) indicates a failure to acquire the URL of the server 2 from the destination providing server 5. Here, examples of the cause of a failure to acquire the URL of the server 2 include a failure to connect to the server 2 due to server down, network down, or the like.

When the URL of the server 2 is saved (stored) in the storage unit (the flash memory 24, or the like) (Step S26: Yes), the activating unit 272 transfers the URL of the server 2 to the browser app, and the browser app transmits, to the server 2 designated with the URL received from the activating unit 272, a screen information request and a display information request including the model information for identifying the model of the MFP 6, the region information, and the locale information (language information) to request screen information and display information (application list screen) (Step S27).

Then, the activating unit 272 determines whether the screen information and the display information have been acquired from the server 2 (Step S28). When the screen information and the display information have been acquired (Step S28: Yes), the process is terminated. Specifically, a screen is generated at Step S15 in FIG. 52, and the screen is displayed at Step S16.

When the screen information and the display information have not been acquired (Step S28: No), the activating unit 272 determines whether the URL of the next server is saved (stored) in the storage unit (the flash memory 24, or the like) (Step S29). As described above with the connection-information identifying unit 322 and the list generating unit 323, there is a case where the URL of the single server 2 is acquired from the destination providing server 5 or a case where the list of URLs of multiple servers is acquired; therefore, the connection-information acquiring unit 271 performs a determination process at Step S29.

When the URL of the next server 2 is saved (stored) in the storage unit (the flash memory 24, or the like) (Step S29: Yes), Step S27 is returned, and the process for the request to acquire screen information and display information is continued. When the URL of the next server 2 is not saved (stored) in the storage unit (the flash memory 24, or the like) (Step S29: No), an error screen is displayed on the operation panel 27 (display unit) (Step S30), and the process is terminated. That is, a case where the URL of the next server 2 is not saved (stored) in the storage unit (the flash memory 24, or the like) indicates a failure to acquire screen information from the server even by using URLs of the single server 2 or multiple servers acquired from the destination providing server 5. Here, examples of the cause of a failure to acquire the URL of the server 2 include a failure to connect to the server 2 due to server down, network down, or the like.

Figure 54:
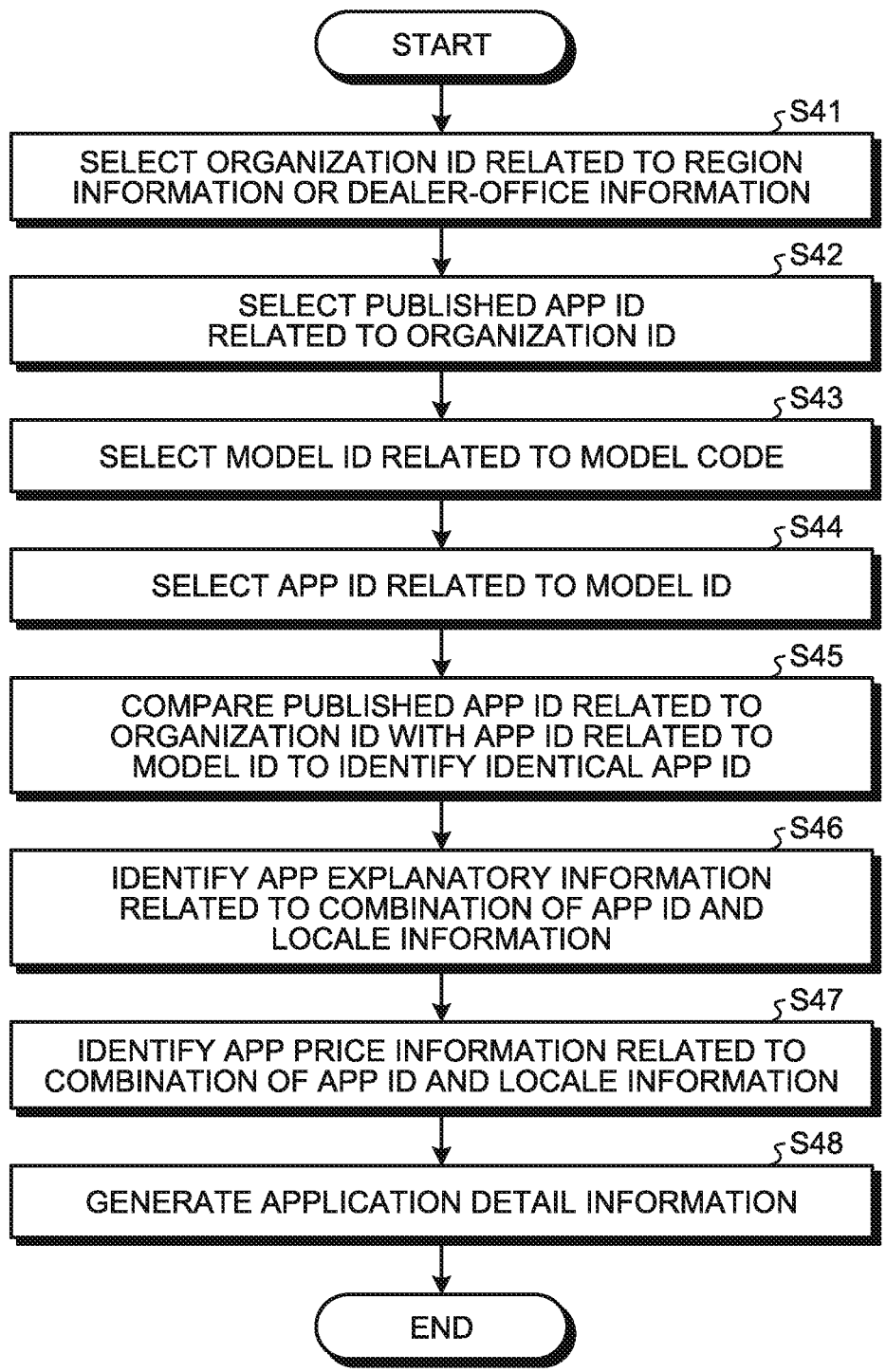
FIG. 54 is a flowchart that illustrates an operation example of the server.

FIG. 54 is a flowchart that illustrates an operation example of the server 2 when the server 2 generates application detail information that is related to the detail information indicating the details of a corresponding application with regard to each application that is associated with the organization providing the application that is related to region information or dealer-office information and that is available to the MFP 6 at the above-described Step S13 in FIG. 52. As illustrated in FIG. 54, when the above-described display information request is received from the MFP 6, the identifying unit 216 refers to the third relation information illustrated in FIG. 7 to select the organization ID that is related to the region information or the dealer-office information included in the received display information request (Step S41). Then, the identifying unit 216 refers to the fourth relation information illustrated in FIG. 8 to select the app ID related to publication state information indicating a public state among one or more app IDs related to the selected organization ID (Step S42). Then, the identifying unit 216 refers to the first relation information illustrated in FIG. 5 to select the model ID related to the model code included in the received display information request (Step S43). Then, the identifying unit 216 refers to the second relation information illustrated in FIG. 6 to select one or more app IDs related to the selected model ID (Step S44). Here, the identifying unit 216 also identifies the version information related to the app ID selected at Step S44 in the second relation information illustrated in FIG. 6. Then, the identifying unit 216 compares the published app ID among one or more app IDs related to the organization ID selected in FIG. 8 with one or more app IDs related to the model ID selected in FIG. 6 to identify an identical app ID (Step S45). Then, the identifying unit 216 refers to the fifth relation information illustrated in FIG. 9 to identify the app explanatory information that is related to the combination of the app ID identified at Step S45 and the language information (locale information) included in the display information request received from the MFP 6 (Step S46). Then, the identifying unit 216 refers to the sixth relation information illustrated in FIG. 10 to identify the app price information that is related to the combination of the app ID selected at Step S45 and the language information (locale information) included in the display information request received from the MFP 6 (Step S47). Then, for each app ID identified at Step S45, the display-information generating unit 217 is capable of generating application detail information such that it is related to the detail information including the app explanatory information identified at Step S46, the version information related to the app ID selected at Step S44 in the second relation information illustrated in FIG. 6, the license key if any license key is set, and the app price information identified at Step S47 (Step S48).

Figure 55:
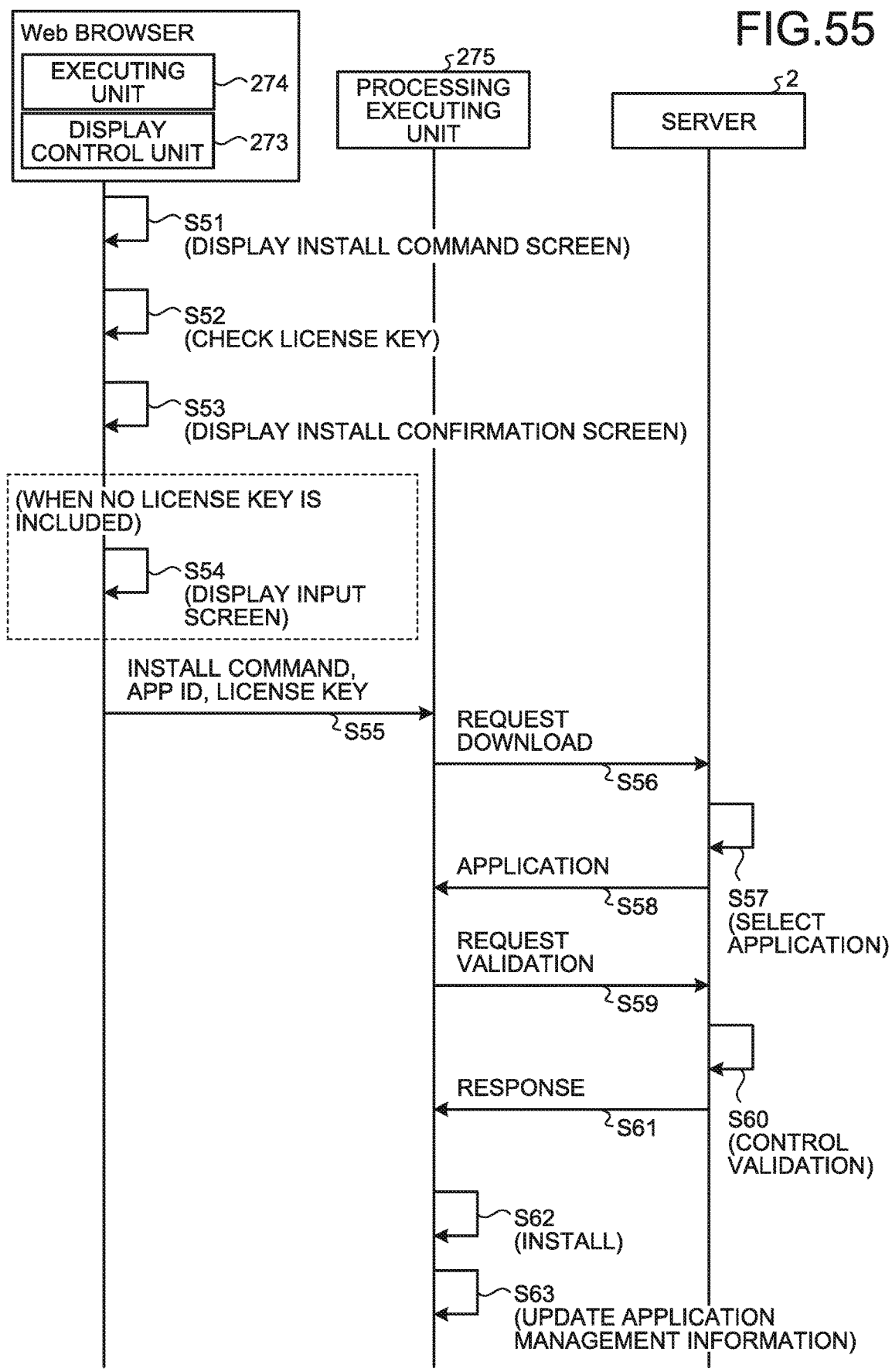
FIG. 55 is a sequence diagram that illustrates an example of the steps of an operation of the system.

FIG. 55 is a sequence diagram that illustrates an example of the steps of an operation of the system 1 when any of the application selection buttons 331 displayed on the application list screen illustrated in FIG. 38 is pressed. As described above, when a press is received on any of the application selection buttons 331, the display control unit 273 performs control to display the above-described install command screen (see FIG. 41) on the operation panel 27 (Step S51). Then, when a press is received on the install button 332, the display control unit 273 refers to the screen information received from the server 2 to check whether a license key is included in the detail information that corresponds to the application targeted for an install command, selected in accordance with user's operation, in the application detail information in the display information included in the screen information (Step S52). As a check result at Step S52, when a license key is included, a control is performed to display the above-described install confirmation screen (see FIG. 42) on the operation panel 27 (Step S53).

As a check result at Step S52 described above, when a license key is not included (that is, the application targeted for an install command is a non-free application), the display control unit 273 performs control to display the input screen of FIG. 44 described above on the operation panel 27 (Step S54) and receives an input of a license key from a user. It is assumed here that a user previously knows the license key that is related to a purchased application. For example, a configuration may be such that the administrator of an application notifies a user who purchased the application of the license key by mail, e-mail, or the like.

Then, the executing unit 274 notifies the processing executing unit 275 of the install command selected in accordance with user's operation, the app ID (the app ID of the application targeted for the install command selected) and the license key (the license key for the application targeted for the install command selected) (Step S55). The processing executing unit 275 uses the license key notified by the executing unit 274 to execute the install command notified by the executing unit 274. More specifics are described below. First, the processing executing unit 275 transmits, to the server 2, the above-described download request including at least the app ID of the application targeted for the install command to request the download of the application (Step S56). After receiving the download request, the server 2 (the download unit 232) selects the application that is related to the app ID included in the received download request (Step S57) and transmits the selected application to the MFP 6 (Step S58).

Then, the processing executing unit 275 transmits, to the server 2, the above-described validation request including at least the app ID, the license key, and the device number to request validation of a license (Step S59). After receiving the validation request, the server 2 (the license validating unit 227) performs control to validate the license (Step S60) and then transmits a response to the validation request to the MFP 6 (Step S61). The details of Step S60 are described above, and when the above-described validation request is received from the MFP 6, the license validating unit 227 checks whether the license key included in the received validation request is present in the license information DB 224. When the license key is present, the license validating unit 227 updates information stored in the license information DB 224 as described above. Furthermore, the license validating unit 227 may also issue a license file that defines the license (the right of use) such as the period of validity of the application identified with the app ID included in the validation request received from the MFP 6 and, as a response to the validation request, transmit the license file in addition to the message that the license is in a valid state. Conversely, when the license key included in the received validation request is not present in the license information DB 224, an error is transmitted as a response to the validation request.

When the message that the license is in a valid state is received as a response to the validation request, the MFP 6 (the processing executing unit 275) performs control to install the application downloaded from the server 2 at Step S58 (Step S62). After installation is completed, the processing executing unit 275 updates the above-described application management information by adding the app ID of the application, which has been completely installed, and the version of the application during installation to the application management information in a related manner (Step S63).

Figure 56:
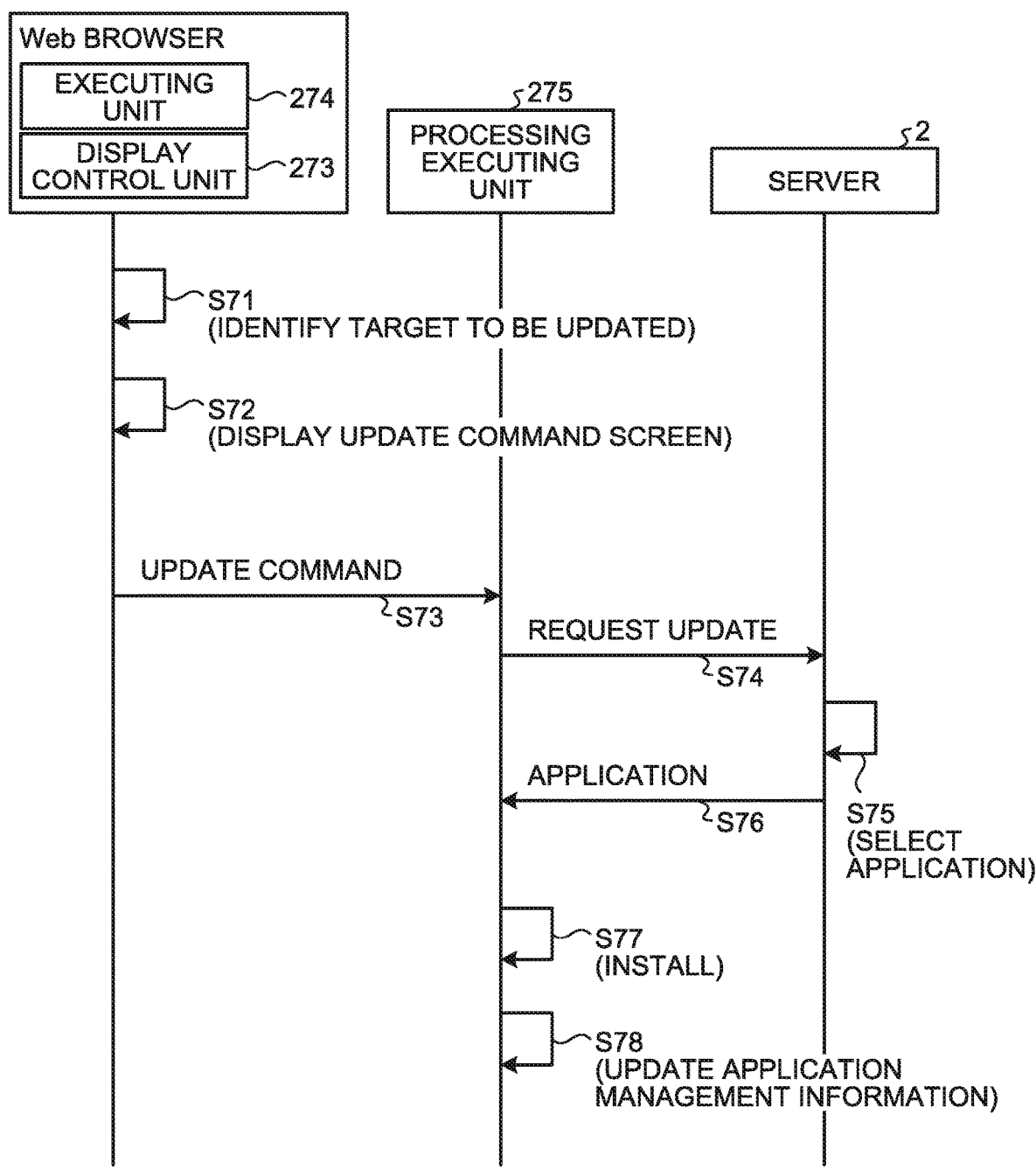
FIG. 56 is a sequence diagram that illustrates an example of the steps of an operation of the system.

FIG. 56 is a sequence diagram that illustrates an example of the steps of an operation of the system 1 when the update selection button 325 displayed on the application list screen illustrated in FIG. 38 is pressed. As described above, when a press is received on the update selection button 325, the display control unit 273 identifies the target application to be updated among the applications installed in the MFP 6 (Step S71). Then, with regard to each application identified at Step S71, a control is performed to display the update command screen (see FIG. 47) for receiving an update command for the application on the operation panel 27 (Step S72). The details are described above.

Then, when a press is received on any of the update command buttons 341, the executing unit 274 notifies the processing executing unit 275 of the update command attached to the update command button 341 (Step S73). The processing executing unit 275 executes the update command notified by the executing unit 274. More specifics are described below. First, the processing executing unit 275 transmits, to the server 2, the update request including at least the app ID of the target to be updated to request the application with the latest version (Step S74). After receiving the update request, the server 2 selects the application that is related to the app ID included in the received update request (Step S75) and transmits the selected application to the MFP 6 (Step S76).

Then, the MFP 6 (the processing executing unit 275) performs control to install the application received from the server 2 (newly download application) as a response to the update request (Step S77). After installation is completed, the processing executing unit 275 updates the above-described application management information by adding the app ID of the application, which has been completely installed, and the version of the application during installation (during update) to the application management information in a related manner (Step S78).

Figure 57:
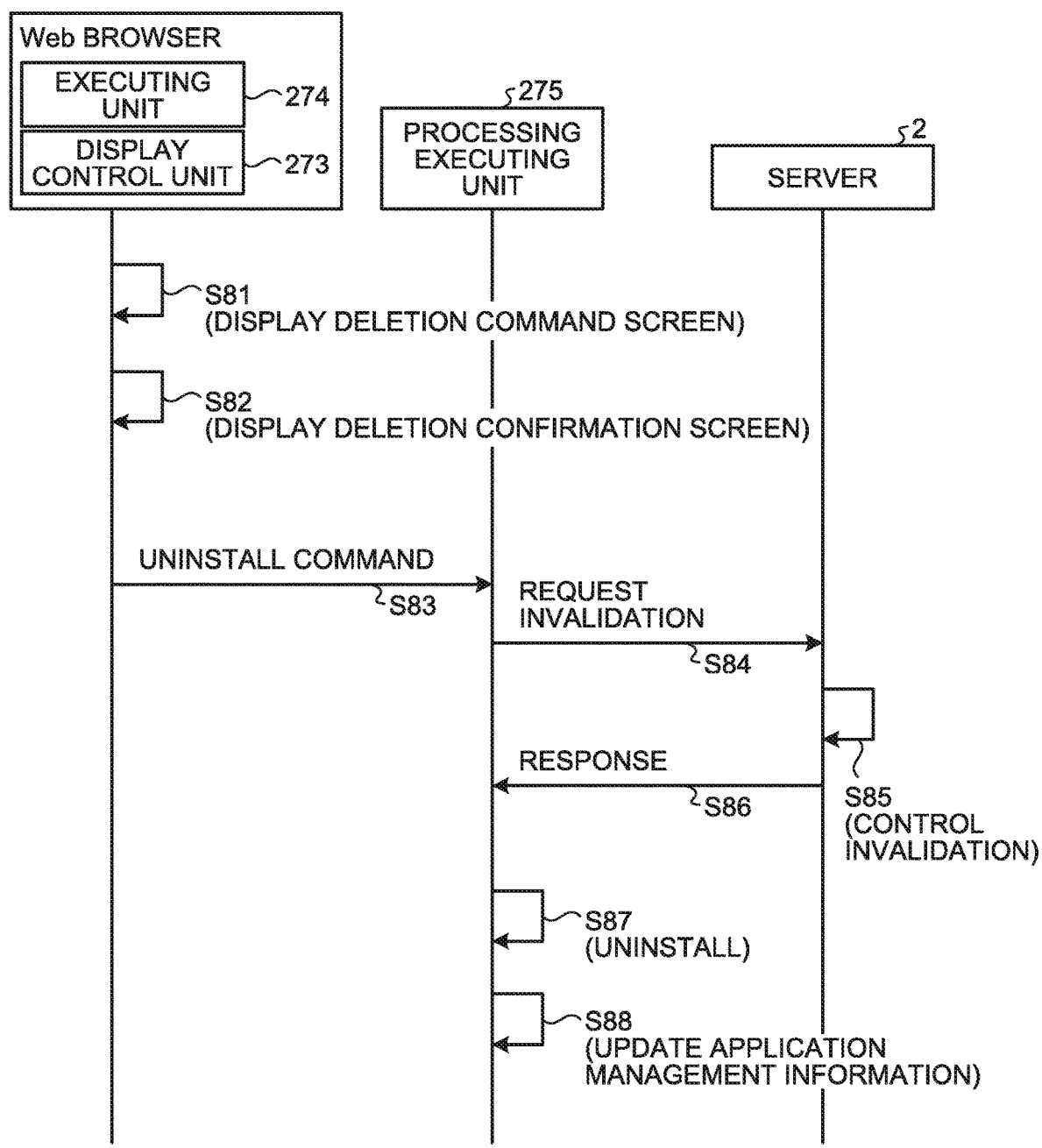
FIG. 57 is a sequence diagram that illustrates an example of the steps of an operation of the system.

FIG. 57 is a sequence diagram that illustrates an example of the steps of an operation of the system 1 when the deletion selection button 326 displayed on the application list screen illustrated in FIG. 38 is pressed. As described above, when a press is received on the deletion selection button 326, the display control unit 273 performs control to display the above-described deletion command screen (see FIG. 49) on the operation panel 27 (Step S81). Then, when a press is received on any of the deletion command buttons 351, the display control unit 273 performs control to display the above-described deletion confirmation screen (see FIG. 50) on the operation panel 27 (Step S82). Then, when a press is received on the confirmation button 361 displayed on the deletion confirmation screen, the executing unit 274 notifies the processing executing unit 275 of the uninstall command selected in accordance with user's operation (the uninstall command attached to the pressed confirmation button 361) (Step S83).

The processing executing unit 275 executes the uninstall command notified by the executing unit 274. More specifics are described below. First, the processing executing unit 275 transmits, to the server 2, the above-described invalidation request including at least the license key related to the application targeted for the uninstall command and the device number to request invalidation of the license (Step S84). After receiving the invalidation request, the server 2 (the license invalidating unit 228) performs control to invalidate the license (Step S85) and then transmits the response to the invalidation request (here, the response indicating that the license is in an invalid state) to the MFP 6 (Step S86). The details of Step S85 are described above, and when the above-described invalidation request is received from the MFP 6, the license invalidating unit 228 changes the validity state information related to the combination of the license key and the device number, included in the received invalidation request in information stored in the license information DB 224, to the information indicating "invalid", decrements the in-use license number related to the license key included in the received invalidation request by "1", and increments the used license number by "1".

When the message indicating that the license is in an invalid state is received as a response to the invalidation request, the MFP 6 (the processing executing unit 275) performs control to uninstall the application related to the license key included in the invalidation request (Step S87). After uninstallation is completed, the processing executing unit 275 deletes the information related to the application that has been completely uninstalled from the above-described application management information, thereby updating the application management information (Step S88).

As described above, according to the present embodiment, the server 2 includes the control unit 212 that performs control to transmit, to the MFP 6, Web content data including at least the display information indicating the application that is associated with the region information on the MFP 6 installed and that is available to the MFP 6 and the application command for causing the MFP 6 to perform processing in connection with the application in accordance with a request from the MFP 6 connected via the network 7, and the MFP 6 includes the connection-information acquiring unit 271 that acquires the connection information on the server 2 that is connected when the activating unit 272 activates the browser app; the display control unit 273 that performs control to display the screen based on the Web content data received from the server 2 on the operation panel 27; and the executing unit 274 that executes the application command included in the Web content data in accordance with user's operation via the screen displayed on the operation panel 27 and requests the MFP 6 to perform processing in connection with the application related to the application command. Therefore, even when the display information is freely changed at the side of the server 2, the application command included in Web content data may be executed by the MFP 6; thus, there is no need to change programs at the side of the MFP 6 in accordance with changes in the display information. That is, according to the present embodiment, it is possible that, for example, a system for generating pages having display contents that are different from region to region is implemented by the server 2 that provides pages for introducing applications available to the MFP 6. Furthermore, the MFP 6 stores the connection information on the destination providing server 5 and acquires and stores the connection information on the server 2, from which screen information and display information are acquired, from the destination providing server 5; therefore, for example, when the number of the servers 2 is increased, or when the installation position of the server 2 at each region is changed, there is no need to change programs at the side of the MFP 6. Furthermore, as described above, the MFP 6 stores multiple pieces of connection information on the servers 2; therefore, when the server 2 is not connectable, the different server 2 having an equivalent function is selected to conduct communications, and thus there is a significant advantage such as improvements in availability.

Although the embodiment according to the present invention has explained above, the present invention is not limited to the above-described embodiment as it is, and components are modifiable for embodiments without departing from the scope at embodiment phases. Furthermore, various inventions may be implemented by appropriately combining components disclosed in the above-described embodiment.

For example, some components are deletable from the entire components disclosed in the embodiment.

Figure 58:
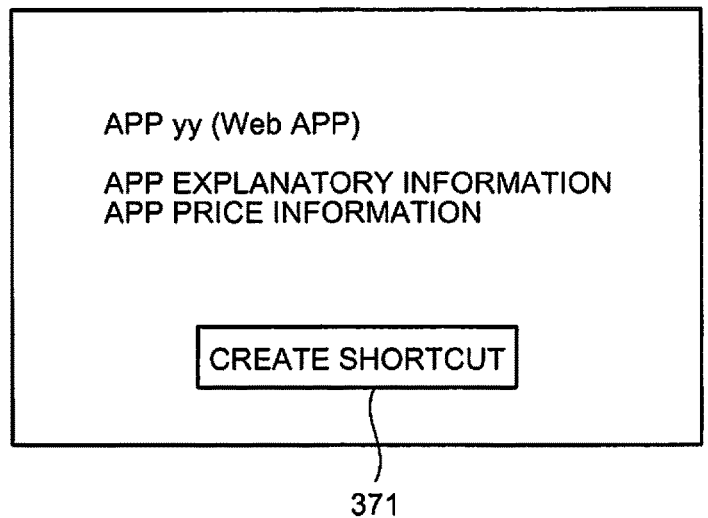
FIG. 58 is a diagram that illustrates an example of a shortcut creation command screen.

For example, the applications displayed on the application list screen illustrated in FIG. 38 (the applications available to the MFP 6) may include applications (that is, Web apps) that are configured such that applications provided in the server 2 are used as browser apps in the operating unit 20. The Web apps do not need to be installed in the MFP 6; therefore, a configuration may be such that, when a press is received on the application selection button 331 that is related to the Web app, the display control unit 273 performs control to display a shortcut creation command screen illustrated in FIG. 58, for example, on the operation panel 27. The shortcut creation command screen displays the app explanatory information and the app price information on a corresponding application (Web app) and a shortcut creation button 371 for giving a command to create a shortcut icon to invoke the function of the Web app. In this example, the shortcut creation button 371 is attached to a shortcut creation command indicating a command to create a shortcut. When a press is received on the shortcut creation button 371, the executing unit 274 notifies the processing executing unit 275 of a shortcut creation command that is attached to the shortcut creation button 371. Then, the processing executing unit 275 executes the shortcut creation command notified by the executing unit 274. That is, the application command may include a shortcut-icon creation command indicating a command to create a shortcut icon for invoking the function of the Web app. In this case, a configuration may be such that, when a shortcut-icon creation command is selected in accordance with user's operation (for example, when the above-described shortcut creation button 371 is pressed), the executing unit 274 notifies the processing executing unit 275 of the selected shortcut-icon creation command (the shortcut creation command attached to the pressed shortcut creation button 371), and the processing executing unit 275 executes the shortcut-icon creation command notified by the executing unit 274. When the display information received by the MFP 6 from the server 2 includes an app that needs to be installed and a Web app in a mixed manner, "appType" in the detail information of FIG. 40 is checked so that it is possible that, when the value is "install", it is determined that the app needs to be installed and FIG. 41 is displayed, and when the value is "web", it is determined that it is a Web app and FIG. 58 is displayed.

Furthermore, a configuration may be such that for example the operating unit 20 (the MFP 6) further includes a function (an authority-information managing unit) to manage authority information related to the authority of a user with respect to each user. The display control unit 273 refers to authority information acquired from the authority-information managing unit, and when the authority related to a user who is using the MFP 6 (a user who is authorized to use the MFP 6, a user who has logged in) makes it impossible to give a command to execute installation, for example, the install button 332 illustrated in FIG. 41 may be also hid. Similarly, when the authority related to a user who is using the MFP 6 makes it impossible to give a command to execute updating, for example, the update command button 341 illustrated in FIG. 47 may be also hid. Furthermore, when the authority related to a user who is using the MFP 6 makes it impossible to give a command to execute uninstallation, for example, the deletion command button 351 illustrated in FIG. 49 may be also hid.

Furthermore, according to the above-described embodiment, the main body 10 and the operating unit 20 operate independently in different operating systems; however, this is not a limitation, and, for example, a configuration may be such that the main body 10 and the operating unit 20 operate in the same operating system. That is, the main body 10 and the operating unit 20 may be integrally configured.

Figure 59:
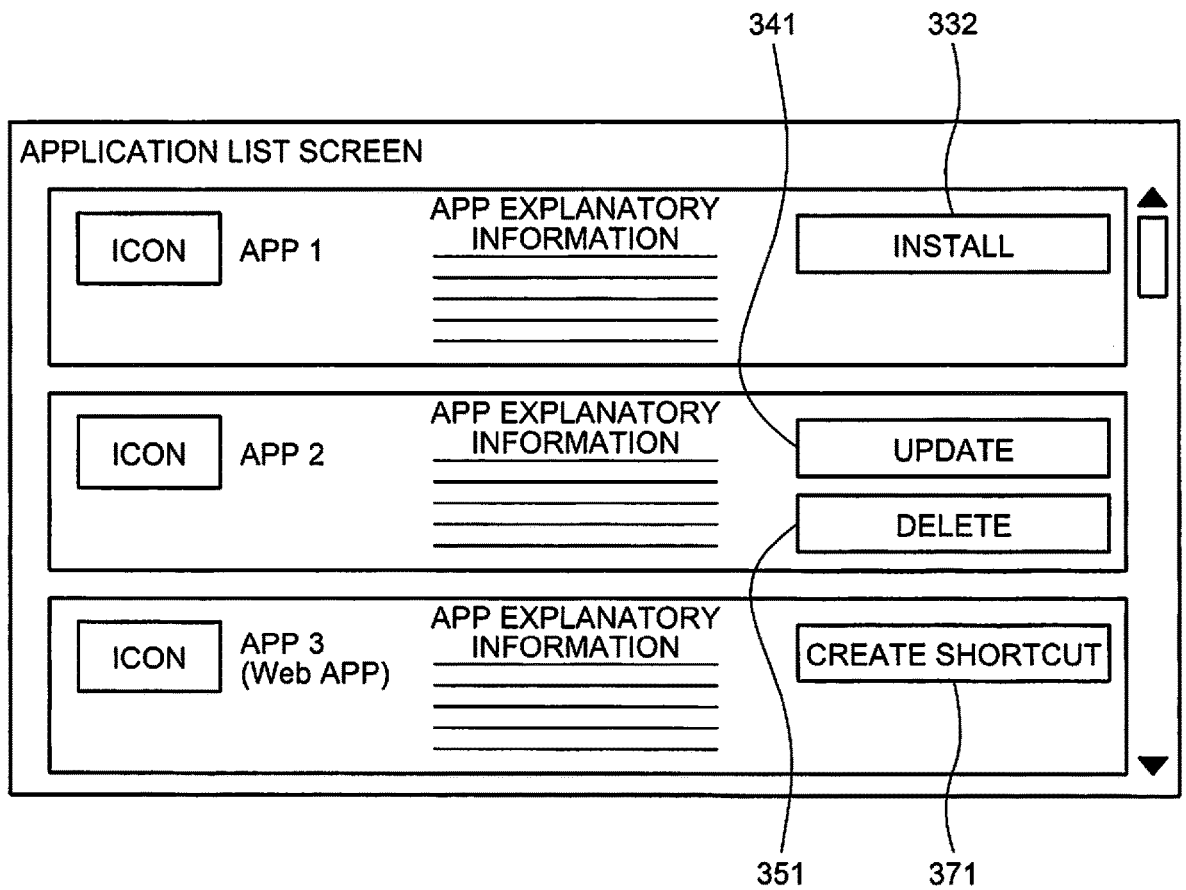
FIG. 59 is a diagram that illustrates an example of an application list screen according to a modification.

Furthermore, the above-described application list screen has any configuration, and it may have a configuration that is the combination of the above-described examples as illustrated in for example FIG. 59.

Furthermore, a configuration may be such that, for example, the above-described screen providing unit 213 generates Web content data including the above-described application command only when the above-described screen information request is received from an image forming device including the MFP 6. That is, a configuration may be such that, when the screen information request is received from a device (PC, tablet, or the like) other than image forming devices, the screen providing unit 213 generates Web content data that does not include any application command and, as a response to the screen information request, transmits the generated Web content data to the device. With this configuration, when the screen information request is received from a device other than image forming devices, the above-described screen providing unit 213 may be configured to generate Web content data that does not include any application command and, as a response to the screen information request, transmit the generated Web content data to the device. With this configuration, when the screen information request is received from a device other than image forming devices, the above-described screen providing unit 213 may be configured to generate Web content data that does not include information (button) for selecting an application command (install command, update command, uninstall command, or the like) and, as a response to the screen information request, transmit the generated Web content data to the device. Furthermore, any method may be used to determine whether the screen information request received from a device is a screen information request from the MFP 6: it may be a method of determination using for example a User-Agent header, or it may be a method of authenticating a device during the first access from the MFP 6 (conducting authentication as to whether it is the MFP 6 or not). Furthermore, it may be a method of executing commands for the MFP 6 in for example JavaScript and, when an error occurs, determining that it is a device other than the MFP 6.

Furthermore, a configuration may be such that programs executed by the system 1 (the server 2, the MFP 6, or the like) according to the above-described embodiment are provided by being recorded in recording media readable by computers, such as CD-ROM, flexible disk (FD), CD-R, DVD (digital versatile disk), or USB (universal serial bus), in the form of file installable or executable, or a configuration may be such that they are provided or distributed via a network such as the Internet. Furthermore, a configuration may be such that various programs are provided by being previously installed in a ROM, or the like.

REFERENCE SIGNS LIST

1 SYSTEM
2, 3, 4 SERVER
5 DESTINATION PROVIDING SERVER
6 MFP
7 NETWORK
8 ICON
10 MAIN BODY
11 CPU

12 ROM
13 RAM
14 HDD
15 COMMUNICATION I/F
16 CONNECTION I/F
17 ENGINE UNIT
18 SYSTEM BUS
20 OPERATING UNIT
21 CPU
22 ROM
23 RAM
24 FLASH MEMORY (STORAGE UNIT)
25 COMMUNICATION I/F
26 CONNECTION I/F
27 OPERATION PANEL
28 SYSTEM BUS
30 COMMUNICATION PATH
101 APP LAYER
102 SERVICE LAYER
103 OS LAYER
201 APP LAYER
202 SERVICE LAYER
203 OS LAYER
210 APP-INFORMATION MANAGEMENT MODULE
211 STORAGE UNIT
212 CONTROL UNIT
213 SCREEN PROVIDING UNIT
214 SETTING UNIT
216 IDENTIFYING UNIT
217 DISPLAY-INFORMATION GENERATING UNIT
219 SETTING CONTROL UNIT
220 LICENSE MANAGEMENT MODULE
221 STORAGE UNIT
222 CONTROL UNIT
223 LICENSE ISSUANCE UNIT
224 LICENSE INFORMATION DB
225 USER INFORMATION DB
226 REGISTRATION CONTROL UNIT
227 LICENSE VALIDATING UNIT
228 LICENSE INVALIDATING UNIT
230 APP-DOWNLOAD MANAGEMENT MODULE
231 APP STORAGE
232 DOWNLOAD UNIT
240 APPLICATION SERVER
250 DATABASE SERVER
261 APP INFORMATION DB
262 USER INFORMATION DB
271 CONNECTION-INFORMATION ACQUIRING UNIT
272 ACTIVATING UNIT
273 DISPLAY CONTROL UNIT
274 EXECUTING UNIT
275 PROCESSING EXECUTING UNIT
301 CPU
302 ROM
303 RAM
304 COMMUNICATION I/F
305 INPUT DEVICE
306 DISPLAY DEVICE
310 SERVICE RETRIEVING MODULE
311 STORAGE UNIT
312 CONTROL UNIT
321 CONNECTION INFORMATION DB
322 CONNECTION-INFORMATION IDENTIFYING UNIT
323 LIST GENERATING UNIT

CITATION LIST

Patent Literature

Patent Literature 1: Japanese Laid-open Patent Publication No. 2010-182309

The invention claimed is:

1. A system comprising:
a plurality of first servers;
an image forming device connected to each of the first servers via a network; and
a second server connected to each of the first servers and the image forming device via the network,
wherein the first server includes a first processor configured to
transmit to the image forming device, in response to a request from the image forming device, Web content data including at least display information indicating an application available to the image forming device related to region information, and an application command to cause the image forming device to execute processing in connection with the application from the image forming device, the region information indicating a geographical position where the image forming device is installed,
wherein the image forming device includes a second processor configured to
display, on a display a screen based on the Web content data received from the first server, and perform processing in connection with the application related to the application command included in the Web content data by executing the application command in response to a user operation,
perform processing based on a request from a Web browser, the processing in connection with the application related to the request,
transmit a connection-information acquisition request to the second server, the connection-information acquisition request requesting acquisition of connection information, and including at least one of the region information or dealer-office information, the connection information indicating information for connecting to the first server, the dealer-office information indicating a dealer of the image forming-device, and
acquire the connection information, and
wherein the second server includes
a storage unit storing connection relation information, the connection relation information relating the connection information to at least one of the region information or dealer-office information, and
a third processor configured to
receive, from the image forming device, the connection-information acquisition request,
identify the connection information, and
transmit the identified connection information to the image forming device.

2. The system according to claim 1, wherein
the third processor is further configured to
generate connection list information indicating a list of pieces of connection information of the first servers, the connection list information including the pieces of connection information arranged in order of time required for communication with the image forming device from least to greatest, receive the connection-information acquisition request,
identify the pieces of connection information of the first servers, and
transmit the connection list information to the image forming device, and the second processor is further configured to
store the connection list information of the first servers received from the second server, and
transmit the display information request and a screen information request to the first server in an order of the connection list information of the first servers, in response to the connection information of the first server not being receivable from the second server, or in response to not receiving a response to a request to acquire the Web content data from the first server.

3. The system according to claim 1, wherein
the connection relation information further relates device information for identifying the image forming device,
the third processor is further configured to
receive, from the image forming device, a connection-information acquisition request requesting acquisition of the connection information of the first server, the connection-information acquisition request including at least the device information, and
identify the connection information of the first server,
transmit, to the image forming device, the identified connection information of the first server, and the second processor is further configured to
transmit the connection-information acquisition request to the second server, and
acquire the connection information of the first server.

4. The system according to claim 3, wherein
the third processor is further configured to transmit, to the image forming device, connection information indicating information for connecting to the second server together with the connection information of the first server, and
the second processor is further configured to store, in a second storage unit, the connection information of the second server together with the connection information of the first server.

5. The system according to claim 3, wherein
the second server includes a plurality of second servers,
the third processor is further configured to
generate connection list information of the first servers,
generate connection list information of the connection information of the second servers, and
transmit the connection list information of the first servers and the connection list information of the second servers to the image forming device, and the second processor is further configured to
store, in the second storage unit, the connection list information of the second servers together with the connection list information of the first servers, and
transmit, to the second server, the connection-information acquisition request in the order of the connection list information of the second servers, in response to the connection information of the first server not being receivable from the second server.

6. The system according to claim 1, wherein
the region information is included in the dealer-office information, and
the second processor is further configured to
display, on the display, a UI screen for receiving input of code information indicating the dealer-office information in response to the dealer-office information not being stored when the second processor transmits the display information request,
activate a browser app providing a browser function,
receive the input of code information, and
store dealer-office information and region information identified with the code information in the second storage unit.

7. The system according to claim 6, wherein the second processor is further configured to, at least one of
determine whether region information identified from the code information received through the UI screen matches region information identified with code information related to stored dealer-office information, or
determine whether information included in the code information matches target information, and display a screen indicating an error on the display and then displays the UI screen for receiving input of code information indicating the dealer-office information on the display, in response to the information included in the code information not matching the target information.

8. The system according to claim 1, wherein
the first server further includes a second storage unit storing, with regard to each of applications associated with an organization ID publication state information indicating whether a state is public and model information for identifying a model of the image forming device that is capable of using the application in a related manner, the organization ID identifying at least one of an organization providing an application related to the region information or the dealer-office information, and the first processor is further configured to
receive a screen information request requesting the screen information,
generate the screen information, and
transmit the screen information to the image forming device in response to the screen information request,
receive a display information request including the region information and the model information,
identify, from information stored in the second storage unit, an application configured based on the region information included in the display information request, the model information, and the publication state information indicating a public state,
generate the display information indicating the identified application, and
transmit the generated display information to the image forming device in response to the display information request.

9. The system according to claim 1, wherein
the application command includes an install command indicating a command to install an application, and
the second processor is further configured to execute the install command in response to the install command being selected by a user operation.

10. The system according to claim 1, wherein
the application command includes an update command indicating a command to update an application,
the display information includes application detail information that relates each application available to the image forming device with detail information indicating at least a latest version of the application, and
the second processor is further configured to
identify, among applications installed in the image forming device, an application whose current version is different from a version indicated by the detail information in response to a user operation, and execute the update command in response to a user operation selecting the update command.

11. The system according to claim 1, wherein
the application command includes an uninstall command indicating a command to delete an installed application so as to reset a state of the image forming device to a state before the application is installed, and
the second processor is further configured to executes the uninstall command in response to a user operation selecting the uninstall command.

12. The system according to claim 1, wherein
the first is further configured to implement a plurality of modules including at least an app-information management module;
the app-information management module includes a plurality of submodules including a screen providing module; and
the second processor is configured to acquire a URL, the URL including connection information for each of the submodules included in each of the modules.

13. The system according to claim 1, wherein
the image forming device includes
a main body including
a fourth processor configured to implement a first OS, and
a printer or a scanner; and
an operating unit including the second processor, wherein the second processor is further configured to receive an operation request for operating a second OS, and the printer or the scanner, and
implement the Web browser as an application executed under the second OS.

14. A method for a system including a plurality of first servers, a second server, and an image forming device connected to each of the first servers and the second server via a network, the method comprising:
transmitting, by the first server to the image forming device in response to a request from the image forming device, Web content data including at least display information indicating an application available to the image forming device related to region information, and an application command to cause the image forming device to execute processing in connection with the application from the image forming device, the region information indicating a geographical position where the image forming device is installed;
displaying on a display, by the image forming device, a screen based on the Web content data received from the first server;
performing, by the image forming device, processing in connection with the application related to the application command included in the Web content data by executing the application command in response to a user operation;
performing, by the image forming device, processing in connection with the application related to the request;
transmitting, by the image forming device, a connection-information acquisition request to the second server, the connection-information acquisition request requesting acquisition of connection information, and including at least one of the region information or dealer-office information, the connection information indicating information for connecting to the first server, the dealer-office information indicating a dealer of the image forming device;
acquiring, by the image forming device, the connection information;
storing, by the second server, connection relation information relating the connection information to at least one of the region information or dealer-office information;
receiving, by the second server, the connection-information acquisition request from the image forming device;
identifying, by the second server, the connection information; and
transmitting, by the second server, the identified connection information to the image forming device.

15. An image forming device connected to each of a plurality of first servers and a second server via a network, the image forming device comprising:
a first processor configured to
display, on a display, a screen based on Web content data received from the first server, the Web content data including at least display information indicating an application available to the image forming device related to region information, and an application command instructing the image forming device to execute processing in connection with the application, the region information indicating a geographical position where the image forming device is installed,
perform the processing in connection with the application related to the application command included in the Web content data by executing the application command in response to a user operation,
perform processing based on a request from a Web browser, the processing in connection with the application related to the request
transmit a connection-information acquisition request to the second server, the connection-information acquisition request requesting acquisition of connection information, and including at least one of the region information or dealer-office information, the connection information indicating information for connecting to the first server, the dealer-office information indicating a dealer of the image forming device, and
acquire the connection information from the second server.

* * * * *